US011959752B2

(12) United States Patent
Matsumoto et al.

(10) Patent No.: US 11,959,752 B2
(45) Date of Patent: Apr. 16, 2024

(54) VEHICULAR POSITION SPECIFICATION APPARATUS AND VEHICULAR POSITION SPECIFICATION METHOD

(71) Applicant: DENSO CORPORATION, Kariya (JP)

(72) Inventors: Yuusuke Matsumoto, Kariya (JP); Itsuki Chiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 17/653,434

(22) Filed: Mar. 3, 2022

(65) Prior Publication Data

US 2022/0187079 A1 Jun. 16, 2022

Related U.S. Application Data

(63) Continuation of application No. PCT/JP2020/033248, filed on Sep. 2, 2020.

(30) Foreign Application Priority Data

Sep. 5, 2019 (JP) ................................ 2019-162329

(51) Int. Cl.
*G01C 21/30* (2006.01)
(52) U.S. Cl.
CPC .................... *G01C 21/30* (2013.01)
(58) Field of Classification Search
CPC ........ G01C 21/30; G01C 21/32; G01C 21/20; G01C 21/3602; G01C 21/1652; G01C 21/1656; G01C 21/3644; G01C 21/3658; G01C 21/3819; G01C 21/28; G01C 21/3407; G01C 21/3691; G01C 21/3841; G01C 21/3896; G01C 21/14; G01C 21/34; G01C 21/3476; G01C 21/36; G01C 21/3623; G01C 21/3811; G01C 21/3822; G01C 21/3844; G01C 11/06; G01C 21/005; G01C 21/16; G01C 21/26; G01C 21/3679; G01C 21/3804; G01C 21/3837; G01C 21/3867; G01C 21/3878; G01C 21/3881;

(Continued)

(56) References Cited

U.S. PATENT DOCUMENTS

| 9,623,905 | B2 | 4/2017 | Shashua et al. | |
|---|---|---|---|---|
| 2017/0008562 | A1* | 1/2017 | Shashua | ............ B60W 60/0015 |
| 2019/0033867 | A1* | 1/2019 | Sharma | .................. G01C 21/26 |

FOREIGN PATENT DOCUMENTS

JP 2019-132762 A 8/2019

* cited by examiner

*Primary Examiner* — Abby Y Lin
*Assistant Examiner* — Dylan M Katz
(74) *Attorney, Agent, or Firm* — MASCHOFF BRENNAN

(57) ABSTRACT

A lateral position of a vehicle is estimated by collating a position of a lane division line in map data with a relative position of the lane division line with respect to the vehicle indicated by a recognition result by a peripheral monitoring sensor. The lateral position of the vehicle is precluded from being specified using the estimated lateral position of the vehicle in response to a lateral deviation between (i) a position of a landmark in the map data and (ii) a translated landmark position being equal to or greater than a first threshold value. The translated landmark position is a position on map deviated from the estimated lateral position of the vehicle assumed to be the lateral position of the vehicle on map by a relative position of the landmark with respect to the vehicle indicated by the recognition result by the peripheral monitoring sensor.

13 Claims, 5 Drawing Sheets

(58) Field of Classification Search
CPC ...... G01C 21/3889; G01S 5/16; B60W 30/10; B60W 2420/42; B60W 2420/403; B60W 2552/53; B60W 2552/30; B60W 2554/20; B60W 2556/40; B60W 2554/40; B60W 2555/60; B60W 2420/52; B60W 2554/60; B60W 2556/35; B60W 2556/45; B60W 2556/50; B60W 2710/18; B60W 2710/20; B60W 2720/10; B60W 30/14; B60W 30/18; B60W 40/06; B60W 60/00; B60W 60/0015; B60W 60/00274; B60W 10/20; B60W 10/30; B60W 2050/146; B60W 2540/049; B60W 2540/221; B60W 2554/80; B60W 30/06; B60W 30/08; B60W 30/0956; B60W 30/18159; B60W 40/02; B60W 50/14; B60W 60/0016; B60W 60/0051; B60W 60/0059; G08G 1/0969; G08G 1/16; G05D 2201/0213; G05D 1/0212; G05D 1/0246; G05D 1/0274; G05D 1/0231; G05D 1/0088; G05D 1/0278; G05D 1/0219; G05D 1/0221; G05D 1/0251; G05D 1/0253; G05D 1/0287; G05D 1/0094; G05D 1/021; G05D 1/0214; G05D 1/0236; G05D 1/024; G05D 1/0255; G05D 1/027; G05D 1/0276; G06V 20/588; G06V 20/582; G06V 20/584; G06V 20/56; G06V 20/58; G06V 20/63; G06V 20/64; G06V 10/772

See application file for complete search history.

VEHICULAR POSITION SPECIFICATION APPARATUS AND VEHICULAR POSITION SPECIFICATION METHOD

CROSS REFERENCE TO RELATED APPLICATIONS

The present application is a continuation application of International Patent Application No. PCT/JP2020/033248 filed on Sep. 2, 2020, which designated the U.S. and claims the benefit of priority from Japanese Patent Application No. 2019-162329 filed on Sep. 5, 2019. The entire disclosures of all of the above applications are incorporated herein by reference.

TECHNICAL FIELD

The present disclosure relates to a vehicular position specification apparatus and a vehicular position specification method.

BACKGROUND

It is required to specify a vehicular position with higher accuracy for traveling control such as automatic driving of a vehicle such as automobile. Technologies for specifying a vehicular position with high accuracy includes a technology for specifying the vehicular position by collating (that is, matching) the map data with the recognition result of the driving environment using the sensing result of the peripheral monitoring sensor, which is an autonomous sensor that monitors the surroundings of the vehicle.

For example, there is disclosed a technology which estimates the lateral position of the vehicle based on (i) the left and right lane division lines of the traveling lane recognized using the image captured by the camera and (ii) the left and right lane division lines of the traveling lane included in the map information.

SUMMARY

According to an example of the present disclosure, a lateral position of a vehicle is estimated by collating a position of a lane division line in map data with a relative position of the lane division line with respect to the vehicle indicated by a recognition result by a peripheral monitoring sensor. The lateral position of the vehicle is precluded from being specified using the estimated lateral position of the vehicle in response to a lateral deviation between (i) a position of a landmark in the map data and (ii) a translated landmark position being equal to or greater than a first threshold value. The translated landmark position is a position on map deviated from the estimated lateral position of the vehicle assumed to be the lateral position of the vehicle on map by a relative position of the landmark with respect to the vehicle indicated by the recognition result by the peripheral monitoring sensor.

DETAILED DESCRIPTION

Figure 1:
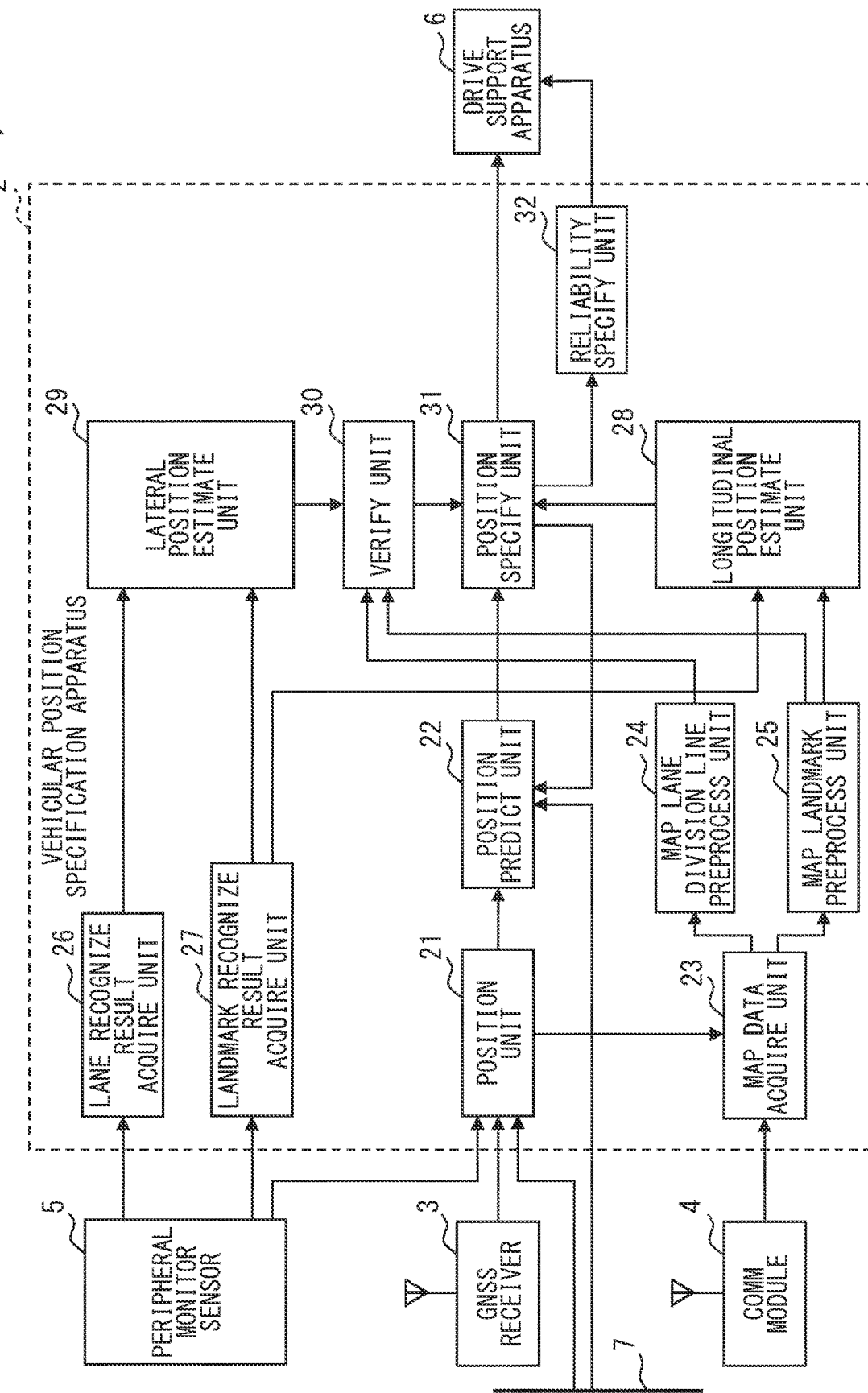
FIG. 1 is a diagram showing an example of a schematic configuration of a vehicular system and a vehicular position specification apparatus.

Multiple embodiments will be described for disclosure hereinafter with reference to the drawings. For convenience of description, the parts having the same functions as the parts shown in the drawings used in the description up to that point in multiple embodiments may be designated by the same reference signs and the description thereof may be omitted. Description in another applicable embodiment may be referred to for such a portion denoted by the identical reference sign.

First Embodiment

<Schematic Configuration of Vehicular System 1>

Hereinafter, a first embodiment of the present disclosure will be described with reference to the drawings. A vehicular system 1 shown in FIG. 1 is used in a vehicle having a driving support function that supports a driver's driving operation. The driving support function referred to here may be configured to include an automatic driving function that substitutes for the driving operation by the driver. An example of driving support is steering correction for maintaining a lane.

As shown in FIG. 1, the vehicular system 1 includes a vehicular position specification apparatus 2, a GNSS receiver 3, a communication module 4, a peripheral monitoring sensor 5, and a driving support apparatus 6. The vehicular position specification apparatus 2 may be connected to an in-vehicle LAN 7. Hereinafter, the vehicle using the vehicular system 1 is referred to as a host vehicle. Although the vehicle using the vehicular system 1 is not necessarily limited to an automobile, hereinafter, an example using the automobile will be described.

The GNSS receiver 3 receives positioning signals from a plurality of positioning satellites, sequentially specifies the host vehicle speed calculated using the Doppler effect of the carrier waves and the coordinate information indicating the current position of the host vehicle, and outputs it to the vehicular position specification apparatus 2. The coordinate information may be coordinate information indicating a latitude, a longitude, and an altitude.

The communication module 4 transmits/receives information to/from a server outside the vehicle via a public communication network. The communication module 4 downloads and acquires map data from a server in which map data is stored (hereinafter referred to as a map server). The map data stored in the map server shall include information on the positions of features such as multiple markings and road markings that exist along the road. The information about the position of the feature may be, for example, coordinate information. The expression "along the road" includes not only the side of the road but also the upper part of the road and the surface of the road. For example, landmarks, such as signs, beacon stations, located 3 m or more above the road surface also fall under the category of features installed along the road. In addition, road-surface markings such as lane division lines and road markings also correspond to features existing along the road. "Along the road" can be paraphrased as on the road and around the road. In addition, the features include the road edge itself.

The map data stored in the map server includes, for example, (i) a road segment in which the shape of a road is represented by a cubic spline curve, and (ii) landmarks existing around the road segment. Road segments and landmarks each have latitude, longitude, and altitude values. Landmarks include, for example, road signs and the like. For example, the information obtained by the peripheral monitoring sensors 5 of a plurality of vehicles may be uploaded to the map server as probe data, and the map data in the map server may be updated sequentially. Further, the map data in the map server may be configured to have an index indicating the certainty of the data. The accuracy of the map data may be set lower, for example, for the target data in which the amount of probe data collected is smaller.

For example, the map data may include road network data, lane network data, feature data, etc., which are hierarchically configured. The road network data includes (i) a link ID, a link length, a number of lanes, and a connection link ID for each road link, and (ii) a node ID, position coordinates, and a connection link ID for each road node. The lane network data includes (i) a lane ID, a link ID at the lane level, a link length, and a connection link ID, and (ii) a node ID, position coordinates, and a connection link ID for each lane node. The link information at the lane level included in the lane network data is associated with the road link included in the road network data.

The feature data includes lane division line data and landmark data. The lane division line data includes a lane division line ID for each lane division line and a group of coordinate points (that is, position information) representing an installation portion. The lane division line data includes pattern information such as broken lines, solid lines, and road studs. The lane division line data is associated with lane information such as a lane ID and a link ID. The landmark data represents the position and type of each landmark. The type of landmark may be, for example, size, shape, color, or the like. The position of the landmark may be represented by a group of coordinate points or may be represented by the center coordinates of the landmark.

The communication module 4 may include a DCM (Data Communication Module). Further, the GNSS receiver 3 may be provided in a DCM or the like.

The peripheral monitoring sensor 5 is configured as a sensor module including (i) an autonomous sensor that monitors the periphery of the host vehicle and (ii) a control unit of the autonomous sensor. The peripheral monitoring sensor 5 may use an autonomous sensor that can specify a relative position of the feature around the host vehicle with respect to the host vehicle by using the sensing result. The peripheral monitoring sensor 5 may be configured such that at least a predetermined range in front of the host vehicle is a sensing range. Examples of the autonomous sensor corresponding to the peripheral monitoring sensor 5 include a camera, LIDAR (Light Detection and Ranging/Laser Imaging Detection and Ranging), a millimeter wave radar, and the like.

The peripheral monitoring sensor 5 may be configured to use a plurality of types of autonomous sensors or may be configured to use one type of autonomous sensor. Further, the same type of autonomous sensor may be configured to include a plurality of autonomous sensors having different sensing ranges. The control unit may be configured to be provided for each of a plurality of autonomous sensors, or may be configured to be provided in common for a plurality of autonomous sensors. Hereinafter, the case where only the front camera having a predetermined range in front of the host vehicle as the sensing range is used as the autonomous sensor included in the peripheral monitoring sensor 5 will be described as an example.

The control unit of the peripheral monitoring sensor 5 analyzes the image captured by the front camera. The control unit recognizes a predetermined feature by, for example, analyzing the detection result of the peripheral monitoring sensor 5. The feature to be recognized is, for example, a feature required for vehicle control. Features detected by the front camera include, for example, lane division lines and landmarks along the traffic lane. The peripheral monitoring sensor 5 performs sensing with the position of the host vehicle as a reference point; thus, the recognition result with the host vehicle as a reference point can be obtained.

The lane division line along the traffic lane is a lane division line extending in the road extension direction. The lane division line along the traffic lane includes, for example, a lane boundary line, a lane center line, a lane outside line, a line indicating a change in lane width, a zebra (channelizing strip) zone, and the like. A lane boundary line is a line provided to indicate a lane boundary. The lane boundary line includes a white solid line, a broken line, etc. painted on the road surface. The lane boundary line may include a marker (that is, a lane mark) embedded in the lane to provide lateral position information in the traveling lane. Hereinafter, the description will be continued by taking as an example the case where the control unit detects the lane boundary line as a lane division line along the traffic lane.

Landmarks are signs such as road signs, traffic lights, poles, and other landmarks. Road signs include regulatory signs, guide signs, warning signs, instruction signs, and the like. The pole may include street lights and utility poles. Landmarks may include commercial advertisements, stores, buildings, and the like. Further, the landmark may include not only a landmark but also a road sign or the like other than a lane division line along a traffic lane. Road signs that can be used as landmarks include regulation signs, instruction signs, pedestrian crossing guidance lines, street parking lot borders, stop lines, safety zones, regulation arrows, and the like. Landmarks can be said to be a feature with a fixed position in space other than the lane division lines along the traffic lane. When the feature has a fixed position in space, the landmark may include road paving conditions, undulations, joints, and the like.

The control unit may separately extract the background and the landmark from the image captured by the front camera. In addition, landmarks may be extracted based on size, shape, and installation position. In the following, the description will be continued by taking the case where the control unit detects a road sign as a landmark as an example.

In addition, the control unit may detect the state quantity (hereinafter referred to as behavior information) indicating the behavior of the vehicle such as yaw rate, longitudinal acceleration, lateral acceleration, etc. acting on the host vehicle from the image captured by the front camera by using SfM (Structure from Motion) technology.

The driving support apparatus 6 executes the above-mentioned driving support function. The driving support apparatus 6 executes the driving support function by using the detailed position of the host vehicle specified by the vehicular position specification apparatus 2. As an example, the host vehicle may be driven along the center of the lane of the traveling lane.

The vehicular position specification apparatus 2 includes, for example, a processor, a memory, an I/O, and a bus connecting these, and executes a process (hereinafter, detailed position specification related process) related to specification of the detailed position of the host vehicle by executing a control program stored in a memory. The memory referred to here is a non-transitory tangible storage medium that stores programs and data that can be read by a computer. Further, the non-transitory tangible storage medium is realized by a semiconductor memory, a magnetic disk, or the like. The vehicular position specification apparatus 2 will be described in detail below.

<Schematic Configuration of Vehicular Position Specification Apparatus 2>

Subsequently, an example of the schematic configuration of the vehicular position specification apparatus 2 will be described with reference to FIG. 1. As shown in FIG. 1, the vehicular position specification apparatus 2 includes a positioning unit 21, a position prediction unit 22, a map data cutting unit 23, a mapped lane division line preprocessing unit 24, a mapped landmark preprocessing unit 25, a lane recognition result acquisition unit 26, a landmark recognition result acquisition unit 27, a longitudinal position estimation unit 28, a lateral position estimation unit 29, a verification unit 30, a position specification unit 31, and a reliability specification unit 32, as functional blocks. In addition, a part or all of the functions executed by the vehicular position specification apparatus 2 may be configured in hardware by one or a plurality of ICs or the like. Further, a part or all of the functional blocks included in the vehicular position specification apparatus 2 may be realized by a combination of software execution by a processor and hardware members.

The positioning unit 21 measures the current position and the traveling direction of the host vehicle in the rough global coordinate system. As an example, the rough current position and travel direction of the host vehicle in the global coordinate system are estimated from the coordinate information acquired from the GNSS receiver 3 and the behavior information such as the vehicle speed and yaw rate of the host vehicle detected by the sensor of the host vehicle acquired from the in-vehicle LAN 7 or the like. The positioning unit 21 uses the coordinate information acquired from the GNSS receiver 3 as the initial coordinates, and estimates the relative coordinates from the initial coordinates using the vehicle speed and yaw rate of the host vehicle. Thereby, the current position and the traveling direction of the host vehicle in the rough global coordinate system can be estimated. When the host vehicle speed can be obtained from the GNSS receiver 3, this host vehicle speed may be used for estimating the current position. When the behavior information detected by using the SfM technique can be obtained from the peripheral monitoring sensor 5, this behavior information may be used for estimating the current position.

Without including the positioning unit 21, the vehicular position specification apparatus 2 may acquire the current position and the traveling direction of the host vehicle in the rough global coordinate system of the host vehicle from the unit having the function of the positioning unit 21.

The position prediction unit 22 provisionally predicts the position of the host vehicle using the behavior information of the host vehicle. When the detailed position of the host vehicle can be specified by the position specification unit 31, which will be described later, the position prediction unit 22 tentatively predicts the position of the host vehicle from the position of the host vehicle previously specified by the position specification unit 31 and the behavior information of the host vehicle. As an example, the position of the host vehicle may be predicted by estimating the relative position from the previous detailed position from the previous detailed position specified by the position specification unit 31, and the behavior information of the host vehicle acquired from the in-vehicle LAN 7 and the peripheral monitoring sensor 5. The position prediction unit 22 may also predict the traveling direction of the host vehicle.

On the other hand, suppose a case when the detailed position of the host vehicle cannot be specified by the position specification unit 31 described later. In such a case, the position prediction unit 22 may predict the position of the host vehicle by using the position of the host vehicle as another reference position instead of using the detailed position of the host vehicle specified at the previous time. For example, when the lane in which the host vehicle travels can be specified, the coordinates of a group of shape points representing the lane center line in the shape information of the lane may be set as the reference position of the host vehicle. In addition, the coordinate information acquired from the GNSS receiver 3 may be used as the reference position of the host vehicle.

The map data cutting unit 23 cuts out map data around the host vehicle from the map server. For example, the map data may be cut out within a predetermined distance from the current position of the host vehicle measured by the positioning unit 21. Further, when the map data is divided and managed for each section, the map data for the section including the current position of the host vehicle may be cut out.

Without including the map data cutting unit 23, the vehicular position specification apparatus 2 may acquire map data around the host vehicle from a unit having the function of the map data cutting unit 23. For example, the communication module 4 may cut out the map data around the host vehicle from the map server, and the vehicular position specification apparatus 2 may acquire the map data cut out by the communication module 4.

The mapped lane division line preprocessing unit 24 selects the map data of the lane division line along the traffic lane from the map data cut out by the map data cutting unit 23. For example, at least the above-mentioned position information of the lane division line along the traffic lane may be acquired. The mapped lane division line preprocessing unit 24 may be configured to acquire the above-mentioned pattern information and the like of the lane division line. Hereinafter, the lane division line along the traffic lane is simply referred to as a lane division line. When the map data is provided with an index indicating the certainty of the data, it is sufficient to narrow down the acquisition to the map data whose certainty is equal to or higher than a certain degree. This mapped lane division line preprocessing unit 24 corresponds to a map data acquisition unit.

The mapped landmark preprocessing unit 25 acquires map data of landmarks other than the lane division lines along the traffic lane from the map data cut out by the map data cutting unit 23. For example, at least map data about the position of this landmark may be obtained. The mapped landmark preprocessing unit 25 may also be configured to acquire information on the type of this landmark. Hereinafter, a landmark other than the lane division lines along the traffic lane is simply referred to as a landmark. When the map data is provided with an index indicating the certainty of the data, it is sufficient to narrow down the acquisition to the map data whose certainty is equal to or higher than a certain degree. This mapped landmark preprocessing unit 25 also corresponds to a map data acquisition unit. In the case where the mapped landmark preprocessing unit 25 is included in the vehicular position specification apparatus 2, the map data cutting unit 23 may correspond to the map data acquisition unit.

The lane recognition result acquisition unit 26 acquires the recognition result of the lane division line detected and recognized by the peripheral monitoring sensor 5. The recognition result includes at least information about the relative position of the lane division line with respect to the host vehicle. The information about the position of the lane division line may be, for example, a coordinate group indicating the lane division line. The recognition result may also include information about the type of this lane division line. When the recognition result is given an index indicating the certainty of the recognition result, the lane recognition result acquisition unit 26 may extract only the recognition results whose certainty is equal to or higher than a certain degree.

The landmark recognition result acquisition unit 27 acquires the landmark recognition result detected and recognized by the peripheral monitoring sensor 5. The recognition result includes at least information about the relative position of this landmark with respect to the vehicle. The information about the position of the landmark may be, for example, the center coordinates of the landmark or a group of coordinate points along the shape of the landmark. The recognition result may also include information about the shape, size, color, etc. of this landmark. When the landmark recognition result acquisition unit 27 is given an index indicating the certainty of the recognition result, the landmark recognition result acquisition unit 27 may extract only the recognition results whose certainty is more than a certain degree.

The longitudinal position estimation unit 28 collates the relative position of the landmark (hereinafter referred to as the recognized landmark) with respect to the host vehicle, which is indicated by the landmark recognition result acquired by the landmark recognition result acquisition unit 27 with the positions of landmarks (hereinafter referred to as mapped landmarks) included in the map data extracted by the mapped landmark preprocessing unit 25. Thereby, localization is performed to estimate the detailed position in the longitudinal direction (hereinafter referred to as the longitudinal position) on the traveling road of the host vehicle on the map. The longitudinal direction can also be rephrased as a front-rear direction of the vehicle. In addition, the longitudinal direction can be paraphrased as an extending direction of the traveling road of the host vehicle. Localization for estimating the longitudinal position corresponds to a process of specifying the position of the host vehicle in the longitudinal direction of the traveling road of the host vehicle. Since the landmark recognition result is the recognition result with respect to the host vehicle as the reference, the above-mentioned localization can be performed.

The longitudinal position estimation unit 28 may collate the position of the recognized landmark with more matching features such as shape, size, and color with the position of the mapped landmark. Thereby, the position of the recognized landmark, which is presumed to be the same, and the position of the mapped landmark may be collated with each other. As an example, the longitudinal position estimation unit 28 matches the position of the recognized landmark with the position of the mapped landmark. Then, the position deviated from the position of the mapped landmark on the map by the offset in the longitudinal direction of the relative position of the host vehicle with respect to the position of the recognized landmark may be estimated as the longitudinal position of the host vehicle on the map.

The lateral position estimation unit 29 collates the relative position of the lane division line (hereinafter referred to as the recognized lane division line) with respect to the host vehicle, which is indicated by the recognition result of the lane division line acquired by the lane recognition result acquisition unit 26 with the position of the lane division line (hereinafter referred to as the mapped lane division line) included in the map data extracted by the mapped lane division line preprocessing unit 24. Thereby, localization is performed to estimate, on the map, the detailed position in the lateral direction (hereinafter referred to as the lateral position) on the traveling road of the host vehicle. The lateral direction can also be rephrased as the left-right direction of the vehicle. In addition, the lateral direction can be paraphrased as the width direction of the traveling road of the host vehicle. Localization for estimating the lateral position corresponds to a process of specifying the position of the host vehicle in the lateral direction of the traveling road of the host vehicle. Since the recognition result of the lane division line is the recognition result with respect to the host vehicle as the reference, the above-mentioned localization can be performed.

The lateral position estimation unit 29 may collate, for example, the position of the recognized lane division line, which the above-mentioned pattern information matches, with the position of the mapped lane division line. Thereby, the position of the recognized lane division line, which is presumed to be the same lane division line, may be collated with the position of the mapped lane division line. As an example, the lateral position estimation unit 29 matches the group of coordinate points as the position of the recognized lane division line with the group of coordinate points as the position of the mapped lane division line. Then, the position deviated from the position of the mapped lane division line on the map by the lateral offset of the relative position of the host vehicle with respect to the position of the recognized lane division line may be estimated as the lateral position of the host vehicle on the map.

The verification unit 30 verifies whether or not the lateral position estimated by the lateral position estimation unit 29 is adopted for specifying the detailed position in the position specification unit 31. The verification unit 30 determines whether or not the lateral deviation between the landmark position indicated by the landmark recognition result acquired by the landmark recognition result acquisition unit 27 and the mapped landmark position is equal to or greater than a first threshold value. It should be noted that the landmark position indicated by the landmark recognition result as used herein need only be in a mode comparable to the position of the mapped landmark.

As an example, assuming that the lateral position of the host vehicle on the map as the lateral position estimated by the lateral position estimation unit 29, the verification unit 30 specifies the landmark position indicated by the recognition result of the landmark as a position on the map into the position on the map (hereinafter referred to as the translated landmark position), into which the relative position of the landmark with respect to the host vehicle indicated by the landmark recognition result acquired by the landmark recognition result acquisition unit 27 is translated. In other words, the position of the landmark indicated by the recognition result of the landmark may be specified to be the position deviated from the lateral position of the host vehicle on the map by the relative position of the landmark with respect to the host vehicle.

The verification unit 30 determines whether or not the deviation in the lateral direction between the specified translated landmark position of the landmark and the position of the mapped landmark is equal to or greater than a first threshold value. Then, when the deviation in the lateral direction is equal to or greater than the first threshold value, it is determined that the lateral position estimated by the lateral position estimation unit 29 is not adopted for specifying the detailed position in the position specification unit 31. On the other hand, when the deviation in the lateral direction is less than the first threshold value, it is determined that the lateral position estimated by the lateral position estimation unit 29 is adopted for specifying the detailed position in the position specification unit 31.

The first threshold value here may be a value according to the accuracy for estimating the lateral position of the host vehicle on the map by collating the relative position of the landmark with respect to the host vehicle indicated by the recognition result of the landmark acquired by the landmark recognition result acquisition unit 27 with the position of this landmark included in the map data. This accuracy can be rephrased as the estimation accuracy of the lateral position in the case of localization for estimating the lateral position using landmarks. It can also be rephrased as the recognition accuracy of the position in the lateral direction in the recognition result of the landmark. The first threshold may be a threshold value for distinguish whether the lateral deviation between the translated landmark position and the mapped landmark position is less than the lateral position estimation accuracy when localizing to estimate the lateral position using the landmark. For example, when the estimation accuracy of the lateral position in the case of localization for estimating the lateral position using landmarks is an accuracy within an error range of 1 m, the first threshold value may be set to 1 m.

When the lane division line is misrecognized, the lateral deviation between the translated landmark position and the mapped landmark position is considered to be large. According to the above configuration, when the lateral deviation between the translated landmark position and the mapped landmark position is equal to or greater than the first threshold value, it is determined that the estimated lateral position is not adopted for specifying the detailed position in the position specification unit 31. Therefore, by using (i) the recognition result of the landmark, which is a geographical feature other than the lane division line, and (ii) the map data, it is possible to determine the error of the estimation result of the lateral position performed by using the map data and the recognition result of the lane division line. Thereby, it is not necessary to specify the lateral position, which is likely to be erroneously estimated due to the recognition error of the lane division line, as the lateral position of the vehicle.

In addition, suppose a case where the lateral deviation between the lateral position of the host vehicle predicted by the position prediction unit 22 and the lateral position estimated by the lateral position estimation unit 29 is less than a second threshold value. In such a case, it is preferable for the verification unit 30 to determine that the lateral position estimated by the lateral position estimation unit 29 is adopted for specifying the detailed position in the position specification unit 31, without determining whether the lateral deviation between the translated landmark position and the mapped landmark position is greater than or equal to the first threshold.

The second threshold value referred to here may be a value according to an accuracy for estimating the lateral position of the host vehicle by collating the relative position of the lane division line with respect to the host vehicle indicated by the recognition result of the lane division line acquired by the lane recognition result acquisition unit 26 with the position of the lane division line included in the map data. This accuracy can be rephrased as an estimation accuracy of the lateral position in the case of localization for estimating the lateral position using the lane division line. It can also be rephrased as a recognition accuracy of the lateral position in the recognition result of the lane division line. The second threshold may be a threshold value for distinguishing whether or not the accuracy is less than the estimation accuracy of the lateral position when the deviation between the lateral position of the host vehicle predicted by the position prediction unit 22 and the lateral position estimated by the lateral position estimation unit 29 is localized to estimate the lateral position using the lane division lines. For example, when the estimation accuracy of the lateral position in the case of localization for estimating the lateral position using the lane division line is within an error range of 10 cm, the second threshold value may be set to 10 cm.

When the lateral deviation between the lateral position of the vehicle predicted by the position prediction unit 22 and the lateral position estimated by the lateral position estimation unit 29 is small, it is highly possible that the lateral position estimation result is considered to be correct. Suppose a case where the lateral deviation between the lateral position of the host vehicle predicted by the position prediction unit 22 and the lateral position estimated by the lateral position estimation unit 29 is less than the second threshold value. In such a case, it is determined that the lateral position estimated by the lateral position estimation unit 29 is adopted for specifying the detailed position in the position specification unit 31, without determining whether the lateral deviation between the translated landmark position and the mapped landmark position is greater than or equal to the first threshold. Therefore, when there is a high possibility that there is no error in the estimation result, the processing load for determining whether or not the lateral deviation between the translated landmark position and the mapped landmark position is equal to or greater than the first threshold value may be omitted. It is possible to specify the lateral position, which is unlikely to be erroneously estimated, as the lateral position of the host vehicle.

In the present embodiment, for example, the accuracy of estimating the lateral position in the case of performing localization in which the lateral position is estimated using landmarks is premised to be lower than the accuracy of estimating the lateral position in the case of performing localization in which the lateral position is estimated using lane division lines. The landmark used for localization to estimate the longitudinal position is usually farther from the host vehicle than the lane division line. Thus, in the landmark, the error in the lateral position of the recognition result tends to spread according to the distance from the host vehicle.

Therefore, it is preferable to use a lane division line instead of a landmark for estimating the lateral position. In contrast, a landmark is preferably used for determining whether or not the estimation of the lateral position using the lane division line is incorrect by determining whether or not the lateral deviation between the translated landmark position and the mapped landmark position is equal to or greater than the first threshold value. This is because it is determined whether or not the lateral deviation between the translated landmark position and the mapped landmark position is equal to or greater than the first threshold value, but the high accuracy of the landmark recognition result itself is not required.

Along with this, the first threshold value according to the estimation accuracy of the lateral position when localizing to estimate the lateral position using landmarks may be set to be larger than the second threshold value according to the estimation accuracy of the lateral position when localizing to estimate the lateral position using the lane division line.

Suppose a case where (i) the lateral deviation between the lateral position of the host vehicle predicted by the position prediction unit 22 and the lateral position estimated by the lateral position estimation unit 29 is equal to or greater than the second threshold value, and (ii) the lateral deviation between the translated landmark position and the mapped landmark position is greater than or equal to the first threshold value. In such a case, the verification unit 30 determines that the lateral position estimated by the lateral position estimation unit 29 is not adopted for specifying the detailed position in the position specification unit 31. When the lateral deviation between the lateral position of the vehicle predicted by the position prediction unit 22 and the lateral position estimated by the lateral position estimation unit 29 is equal to or greater than the second threshold value, it is difficult to determine whether the estimation result of the lateral position is incorrect. When the lateral deviation between the translated landmark position and the mapped landmark position is equal to or greater than the first threshold value, it is determined that the lateral position estimated by the lateral position estimation unit 29 is not adopted for specifying the detailed position in the position specification unit 31. Therefore, as described above, this can preclude the lateral position that is likely to be erroneously estimated due to the recognition error of the lane division line from being specified as the lateral position of the vehicle.

On the other hand, suppose a case where (i) the lateral deviation between the lateral position of the host vehicle predicted by the position prediction unit 22 and the lateral position estimated by the lateral position estimation unit 29 is equal to or greater than the second threshold value, and (ii) the lateral deviation between the translated landmark position and the mapped landmark position is less than the first threshold value. In such a case, the verification unit 30 determines that the lateral position estimated by the lateral position estimation unit 29 is adopted for specifying the detailed position in the position specification unit 31. When the lateral deviation between the lateral position of the vehicle predicted by the position prediction unit 22 and the lateral position estimated by the lateral position estimation unit 29 is equal to or greater than the second threshold value, it is difficult to determine whether the estimation result of the lateral position is incorrect. On the other hand, when the lateral deviation between the translated landmark position and the mapped landmark position is small, it is unlikely that the estimation result of the lateral position is incorrect. Therefore, according to the above configuration, even if it is difficult to determine whether or not the estimation result of the lateral position is incorrect, it is the possible to specify the lateral position, which is unlikely to be erroneously estimated, as the lateral position of the host vehicle.

When the verification unit 30 determines that the lateral position estimated by the lateral position estimation unit 29 is adopted for specifying the detailed position in the position specification unit 31, the lateral position is used to specify the detailed position in the position specification unit 31. On the other hand, when the verification unit 30 determines that the lateral position estimated by the lateral position estimation unit 29 is not adopted for specifying the detailed position in the position specification unit 31, the lateral position is not used for specifying the detailed position in the position specification unit 31.

When the verification unit 30 determines that the lateral position estimated by the lateral position estimation unit 29 is adopted for specifying the detailed position in the position specification unit 31, the position specification unit 31 specifies the detailed position of the host vehicle by using the lateral position estimated by the lateral position estimation unit 29 and the longitudinal position estimated by the longitudinal position estimation unit 28. The position specification unit 31 may also specify the traveling direction of the host vehicle. As an example, the position specification unit 31 calculates and specifies the detailed position and traveling direction of the host vehicle from the position of the host vehicle predicted by the position prediction unit 22 by the extended Kalman filter, and the estimated longitudinal and lateral positions. The extended Kalman filter enables the calculation of a more accurate position and traveling direction of the host vehicle by considering the noise from the predicted value and the observed value. The lateral position estimated by the lateral position estimation unit 29 and the longitudinal position estimated by the longitudinal position estimation unit 28 may be specified as the lateral position and the longitudinal position of the host vehicle, respectively. This may be configured as specifying the detailed position of the host vehicle.

On the other hand, when the verification unit 30 determines that the lateral position estimated by the lateral position estimation unit 29 is not adopted for specifying the detailed position in the position specification unit 31, the position specification unit 31 specifies the detailed position and the traveling direction of the host vehicle without using the lateral position of the host vehicle predicted by the position prediction unit 22. As an example, the lateral position and the longitudinal position of the host vehicle predicted by the position prediction unit 22 may be specified as the detailed positions of the host vehicle; the traveling direction of the host vehicle predicted by the position prediction unit 22 may be specified as the traveling direction of the host vehicle. This is because it is more likely that the detailed position of the vehicle can be specified more accurately by using the lateral position of the vehicle predicted by the position prediction unit 22 rather than using the lateral position that is likely to be incorrect. The position specification unit 31 outputs the specified detailed position and traveling direction of the host vehicle to the driving support apparatus 6. The driving support apparatus 6 provides driving support using the detailed position and traveling direction of the host vehicle.

The reliability specification unit 32 specifies the reliability of the detailed position of the host vehicle specified by the position specification unit 31. As an example, the reliability specification unit 32 may use the value of the error covariance obtained from the calculation result of the extended Kalman filter in the position specification unit 31 as the reliability. Further, the reliability specification unit 32 may set the reliability of the detailed position of the host vehicle specified by the position specification unit 31 without using the lateral position estimated by the lateral position estimating unit 29 to a low value less than a predetermined value. The reliability specification unit 32 outputs the reliability of the specified detailed position of the host vehicle to the driving support apparatus 6. In the driving support apparatus 6, the reliability of the detailed position of the host vehicle may be used to determine whether or not the detailed position of the host vehicle can be used, or may be used to change the degree of driving support. For example, when the reliability is less than the threshold value, the detailed position of the host vehicle may not be used. Further, when the reliability is less than the threshold value, the control torque of the vehicle control in the driving support using the detailed position of the host vehicle may be reduced.

<Detailed Position Specification Related Process in Vehicular Position Specification Apparatus 2>

Figure 2:
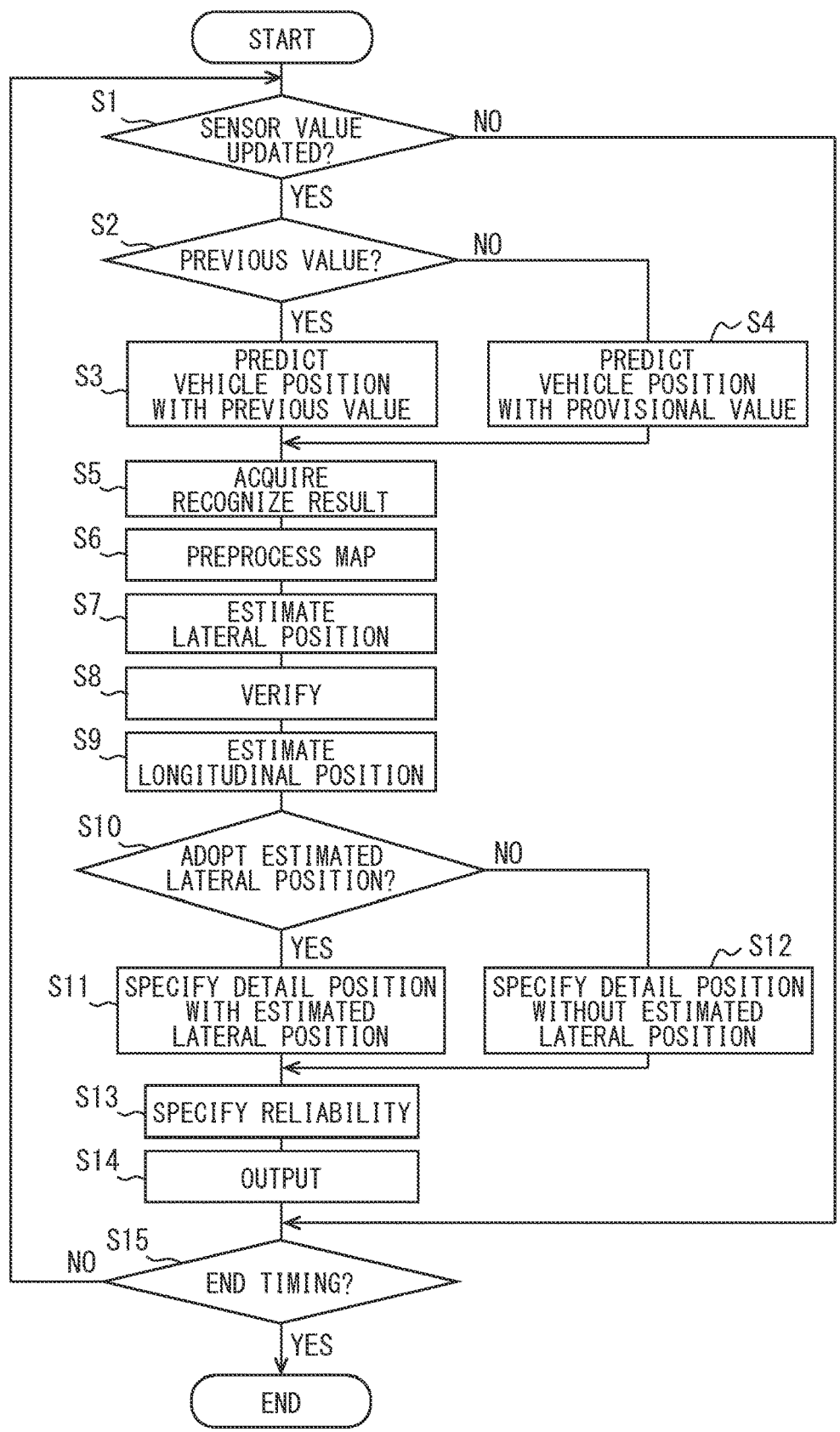
FIG. 2 is a flowchart showing an example of a sequence of a detailed position specification related process in a vehicular position specification apparatus.

Here, an example of the sequence of the detailed position specification related process in the vehicular position specification apparatus 2 will be described with reference to the flowchart of FIG. 2. Execution of the steps included in the detailed position specification related process by the computer corresponds to execution of the vehicular position specification method.

A computer-implemented vehicular position specification method is provided to be used for a vehicle. The method includes the following steps. A lane recognition result acquiring step is acquiring a recognition result of a lane division line along a traffic lane, the lane division line being recognized from a detection result by a peripheral monitoring sensor that monitors a periphery of the vehicle. A landmark recognition result acquiring step is acquiring a recognition result of a landmark that is different from the lane division line along the traffic lane, the recognition result being recognized from the detection result by the peripheral monitoring sensor. A map data acquiring step is acquiring a map data of a map including a position of the lane division line and a position of the landmark. A lateral position estimating step is estimating a lateral position of the vehicle on a traveling road on the map by collating a relative position of the lane division line with respect to the vehicle indicated by the recognition result of the lane division line with the position of the lane division line included in the map data. A position specifying step is not specifying the lateral position of the vehicle using the estimated lateral position in response to a lateral deviation between (i) the relative position of the landmark with respect to the vehicle indicated by the recognition result of the landmark and (ii) the position of the landmark included in the map data being equal to or greater than a first threshold value, and specifying the lateral position of the vehicle using the estimated lateral position in response to the lateral deviation being less than the first threshold value.

The flowchart of FIG. 2 may be configured to be started when, for example, a switch (hereinafter referred to as a power switch) for starting the internal combustion engine or the motor generator of the host vehicle is turned on.

First, in step S1, when the detection result (that is, the sensor value) in the peripheral monitoring sensor 5 is updated (YES in S1), the process proceeds to step S2. On the other hand, when the sensor value is not updated (NO in S1), the process proceeds to step S15. For example, when the peripheral monitoring sensor 5 is a camera, the sensor value is updated at a cycle corresponding to the frame rate. Whether or not the sensor value is updated may be determined, for example, by the vehicular position specification apparatus 2 monitoring the peripheral monitoring sensor 5.

In step S2, when there is a detailed position (that is, the previous value) of the host vehicle previously specified by the position specification unit 31 (YES in S2), the process proceeds to step S3. On the other hand, when there is no previous value (NO in S2), the process proceeds to step S4. The situation in which the detailed position of the host vehicle has never been specified by the position specification unit 31 since the flowchart of FIG. 2 was started corresponds to the case where there is no previous value.

In step S3, the position prediction unit 22 provisionally predicts the position of the host vehicle from the previous value and the behavior information of the host vehicle, and the process proceeds to step S5. On the other hand, in step S4, the position prediction unit 22 predicts the position of the host vehicle by using the position of the host vehicle (that is, the provisional value) as another reference instead of using the previous value.

In step S5, the lane recognition result acquisition unit 26 acquires the recognition result of the lane division line detected and recognized by the peripheral monitoring sensor 5. Further, the landmark recognition result acquisition unit 27 acquires the landmark recognition result detected and recognized by the peripheral monitoring sensor 5.

In step S6, the mapped lane division line preprocessing unit 24 acquires the map data of the lane division line from the map data cut out by the map data cutting unit 23. Further, the mapped landmark preprocessing unit 25 acquires the landmark map data from the map data cut out by the map data cutting unit 23. The processing of S5 and the processing of S6 may be performed in parallel, or the order may be changed.

In step S7, the lateral position estimation unit 29 collates the position of the recognized lane division line indicated by the recognition result of the lane division line acquired in S5 with the position of the mapped lane division line included in the map data acquired in S6 to thereby estimate the lateral position of the host vehicle. In step S8, the verification unit 30 verifies whether or not the lateral position estimated by the lateral position estimation unit 29 is adopted for specifying the detailed position in the position specification unit 31.

In step S9, the longitudinal position estimation unit 28 collates the position of the recognized landmark indicated by the recognition result of the landmark acquired in S5 with the position of the mapped landmark included in the map data acquired in S6. Thereby, the longitudinal position of the host vehicle is estimated.

In step S10, when it is determined in S8 that the lateral position estimated by the lateral position estimation unit 29 is adopted for specifying the detailed position in the position specification unit 31 (YES in S10), the process proceeds to step S11. On the other hand, when it is determined in S8 that the lateral position estimated by the lateral position estimation unit 29 is not adopted for specifying the detailed position in the position specification unit 31 (NO in S10), the process proceeds to step S12.

In step S11, the position specification unit 31 specifies the detailed position of the host vehicle using the lateral position estimated in S7 and the longitudinal position estimated in S9, and the process proceeds to step S13. On the other hand, in S12, the position specification unit 31 specifies the position of the host vehicle predicted in S3 as the detailed position of the host vehicle without using the lateral position estimated in S7, and the process proceeds to step S13.

In step S13, the reliability specification unit 32 specifies the reliability of the detailed position of the host vehicle specified in S11 or S12. In step S14, the position specification unit 31 outputs the detailed position of the host vehicle specified in S11 or S12 to the driving apparatus 6. Further, the reliability specification unit 32 outputs the reliability of the detailed position specified in S13 to the driving apparatus 6.

In step S15, when it is the end timing of the detailed position specification related process (YES in S15), the detailed position specification related process is ended. On the other hand, when it is not the end timing of the detailed position specification related process (NO in S15), the process returns to S1 to repeat the process. An example of the end timing of the detailed position specification related process is that the power switch is turned off.

Brief of First Embodiment

According to the configuration of the first embodiment, the relative position of the lane division line with respect to the host vehicle indicated from the recognition result of the lane division line along the traffic lane recognized from the detection result by the peripheral monitoring sensor 5 and the position of the lane division line included in the map data are collated with each other. Thereby, the lateral position, which is the position of the vehicle in the lateral direction on the traveling road on the map, is estimated. Therefore, when the recognition of the lane division line is correct, it is possible to specify the lateral position of the host vehicle with higher accuracy than to specify the lateral position of the host vehicle by satellite navigation and/or inertial navigation.

Further, according to the configuration of the first embodiment, as described above, when the lateral deviation between the translated landmark position and the mapped landmark position is equal to or greater than the first threshold value, the lateral position of the host vehicle is not specified using the lateral position estimated by the lateral position estimation unit 29. This precludes the lateral position of the host vehicle from being specified by using the lateral position which is likely to be erroneously estimated due to the recognition error of the lane division line. On the other hand, when the lateral deviation between the translated landmark position and the mapped landmark position is less than the first threshold value, the lateral position of the host vehicle is specified by using the lateral position estimated by the lateral position estimation unit 29. Therefore, it is possible to specify the lateral position of the host vehicle by using the lateral position where the possibility of erroneous recognition of the lane division line is low and the possibility of erroneous estimation is low. As a result, it becomes possible to specify the lateral position of the vehicle more accurately because the lateral position of the host vehicle is precluded from being specified by using the lateral position that is likely to be erroneously estimated.

Further, according to the configuration of the first embodiment, the landmark recognition result used for estimating the longitudinal position is used for verification to determine whether or not the lateral position estimated by the lateral position estimation unit 29 is used for specifying the detailed position in the position specification unit 31. Therefore, it is possible to specify the lateral position of the vehicle more accurately while eliminating the waste of recognizing the landmark only for this verification.

In the configuration of the first embodiment, even when the lateral position estimation unit 29 cannot estimate the lateral position using the position of the recognized lane division line indicated by the recognition result of the lane division line acquired by the lane recognition result acquisition unit 26, the position specification unit 31 may specify the detailed position, instead of using the lateral position estimated by the lateral position estimation unit 29.

Second Embodiment

The first embodiment has described a configuration in which the lateral position of the host vehicle on the map is estimated by collating the position of the recognized lane division line with the position of the mapped lane division line, but there is no need to be necessarily limited to this. For example, not only the position of the lane division line along the lane but also the position of the road edge may be used to estimate the lateral position of the host vehicle on the map (hereinafter, a second embodiment). Hereinafter, an example of a second embodiment will be described with reference to the drawings.

<Schematic Configuration of Vehicular System 1*a*>

Figure 3:
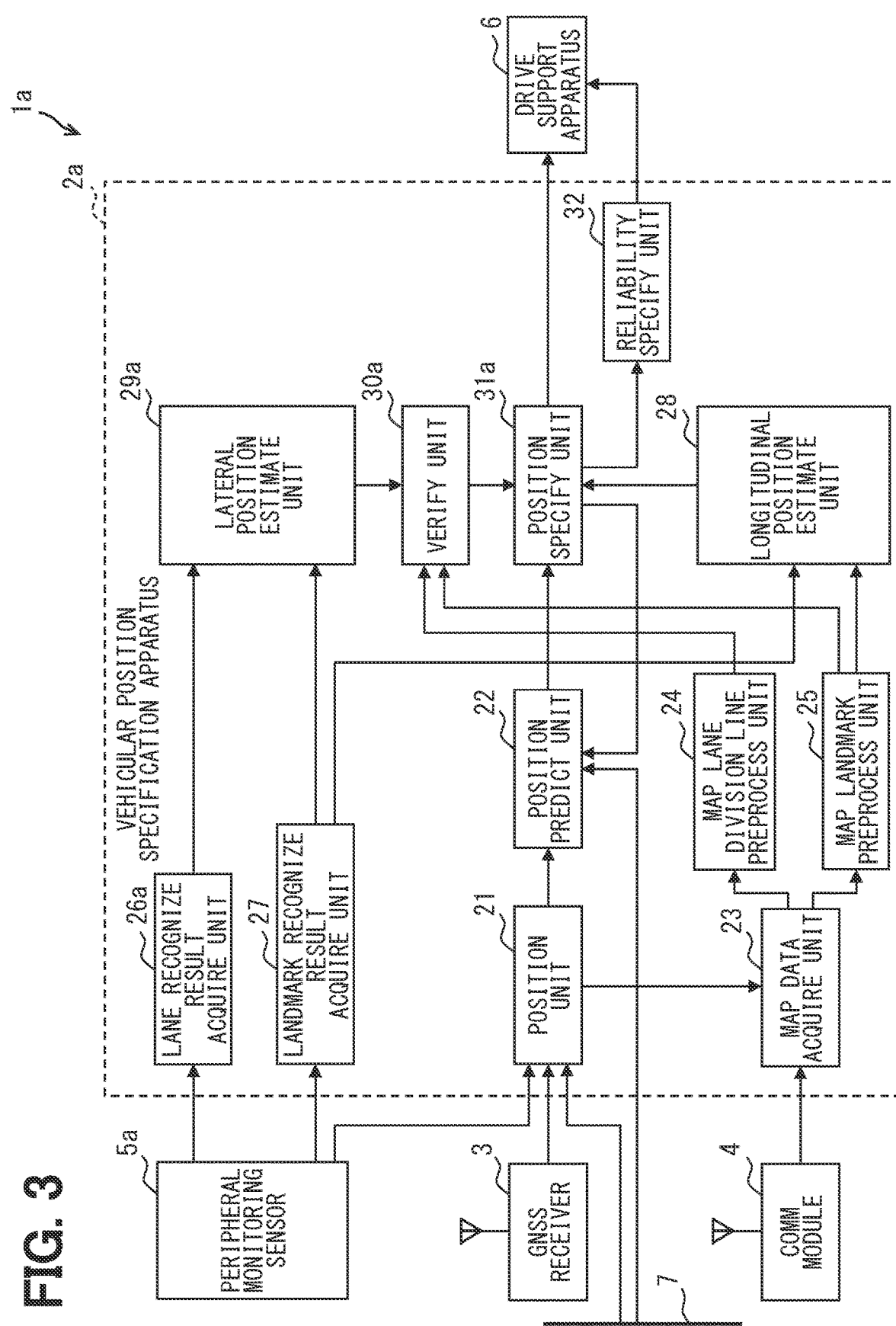
FIG. 3 is a diagram showing an example of a schematic configuration of a vehicular system and a vehicular position specification apparatus.

As shown in FIG. 3, a vehicular system 1*a* of a second embodiment includes a vehicular position specification apparatus 2*a*, a GNSS receiver 3, a communication module 4, a peripheral monitoring sensor 5*a*, and a driving apparatus 6. The vehicular system 1*a* is the same as the vehicular system 1 of the first embodiment except that the vehicular position specification apparatus 2*a* and the peripheral monitoring sensor 5*a* are included in place of the vehicular position specification apparatus 2 and the peripheral monitoring sensor 5.

The peripheral monitoring sensor 5*a* is the same as the peripheral monitoring sensor 5 of the first embodiment, except that it recognizes the road edge in addition to the landmark and the lane division line along the traffic lane. The road edge is a boundary between the road and the outside of the road. The road edge and the lane division line along the traffic lane each correspond to a boundary line. For example, the road edge is a high structure that separates the road from the outside of the road. As an example, a curb, a noise barrier, or the like can be mentioned as a structure (hereinafter referred to as a boundary structure) that separates a road from the outside of the road. Specifically, the position of the lower end on the road side of such a boundary structure may correspond to the position of the road edge. The peripheral monitoring sensor 5*a* may recognize the road edge by edge detection from, for example, an captured image. The peripheral monitoring sensor 5*a* can obtain the recognition result of the road edge with respect to the host vehicle as a reference.

The map data acquired by the communication module 4 in the second embodiment also includes the data of road edges. The data of a road edge may be configured to include a road edge ID for each road edge and a group of coordinate points (that is, position information) representing an existing portion. The data of a road edge may be configured to be associated with lane information such as a lane ID and a link ID.

<Schematic Configuration of Vehicular Position Specification Apparatus 2*a*>

Subsequently, an example of the schematic configuration of the vehicular position specification apparatus 2*a* will be described with reference to FIG. 3. As shown in FIG. 3, the vehicular position specification apparatus 2*a* includes a positioning unit 21, a position prediction unit 22, a map data cutting unit 23, a mapped lane division line preprocessing unit 24, a mapped landmark preprocessing unit 25, a lane recognition result acquisition unit 26*a*, a landmark recognition result acquisition unit 27, a longitudinal position estimation unit 28, a lateral position estimation unit 29*a*, a verification unit 30a, a position specification unit 31a, and a reliability specification unit 32, as functional blocks. The vehicular position specification apparatus 2a is the same as the vehicular position specification apparatus 2 of the first embodiment, except that the lane recognition result acquisition unit 26, the lateral position estimation unit 29, the verification unit 30, and the position specification unit 31 are translated into the lane recognition result acquisition unit 26a, the lateral position estimation unit 29a, the verification unit 30a, and the position specification unit 31a, respectively.

The lane recognition result acquisition unit 26a is the same as the lane recognition result acquisition unit 26 of the first embodiment, except that the recognition result of the road edge detected and recognized by the peripheral monitoring sensor 5a is also acquired. The recognition result of the road edge includes at least information about the relative position of the road edge with respect to the host vehicle. The information about the position of the road edge may be, for example, a group of coordinates indicating the road edge.

The lateral position estimation unit 29a is the same as the lateral position estimation unit 29 of the first embodiment, except using also (i) the relative position of this road edge with respect to the host vehicle (hereinafter referred to as the recognized road edge) indicated by the road edge recognition result acquired by the lane recognition result acquisition unit 26a, and (ii) the position of the road edge (hereinafter referred to as the map road edge) included in the map data extracted by the mapped lane division line preprocessing unit 24.

For example, suppose a case where the lateral position cannot be estimated by the lateral position estimation unit 29a using the position of the recognized lane division line indicated by the recognition result of the lane division line acquired by the lane recognition result acquisition unit 26a. In such a case, the lateral position estimation unit 29a may use the position of the recognition road edge and the map road edge to estimate the lateral position of the host vehicle on the map. More specifically, in this case, the lateral position estimation unit 29a collates the position of the recognized road edge with the position of the mapped road edge. Thereby, it may be configured to perform localization for estimating the lateral position of the host vehicle on the map.

Note that the case, where the lateral position cannot be estimated by the lateral position estimation unit 29a using the position of the recognized lane division line indicated by the recognition result of the lane division line acquired by the lane recognition result acquisition unit 26a, includes (i) a case where the lane division line cannot be recognized, and (ii) a case where the information on the position of the corresponding mapped lane division line does not exist in the map data.

Further, the lateral position estimation unit 29a may collate the position of the recognized lane division line with the position of the mapped lane division line, and also collate the position of the recognized road edge with the position of the mapped road edge. This may be configured to perform localization to estimate the lateral position of the host vehicle on the map. In this case, for example, matching may be performed so as to minimize (i) the deviation between the position of the recognized lane division line and the position of the mapped lane division line and (ii) the deviation between the position of the recognized road edge and the position of the mapped road edge. Thereby, the localization may be performed to estimate the lateral position of the host vehicle on the map.

The verification unit 30a is the same as the verification unit 30 of the first embodiment except that the lateral position estimated by the lateral position estimation unit 29a is used instead of the lateral position estimated by the lateral position estimation unit 29.

The position specification unit 31a is the same as the position specification unit 31 of the first embodiment except that the detailed position of the host vehicle is specified according to the determination by the verification unit 30a instead of the determination by the verification unit 30. Suppose a case where the lateral deviation between the landmark position indicated by the landmark recognition result acquired by the landmark recognition result acquisition unit 27 and the landmark position included in the map data is equal to or greater than the first threshold value. In such a case, the position specification unit 31a does not specify the lateral position of the host vehicle by using the lateral position estimated by the lateral position estimation unit 29a.

Brief of Second Embodiment

Even in the configuration of the second embodiment, it is possible to specify the lateral position of the host vehicle by using the lateral position having a low possibility of erroneous estimation due to a low possibility of recognition of the lane division line. As a result, it becomes possible to specify the lateral position of the vehicle more accurately because of precluding the lateral position of the host vehicle from being specified by using the lateral position that is likely to be erroneously estimated.

In the configuration of the second embodiment, suppose a case where the lateral position estimation unit 29a cannot estimate the lateral position by using either (i) the position of the recognized lane division line indicated by the recognition result of the lane division line acquired by the lane recognition result acquisition unit 26a or (ii) the position of the recognized road edge indicated by the recognition result of the road edge acquired by the lane recognition result acquisition unit 26a. In such a case, the detailed position may be specified by the position specification unit 31 without using the lateral position estimated by the lateral position estimation unit 29a.

Third Embodiment

In the second embodiment, a configuration has been described in which the detailed position is specified by the position specification unit 31a without using the lateral position estimated by the lateral position estimation unit 29a in the case where, the lateral deviation between (i) the landmark position indicated by the landmark recognition result acquired by the landmark recognition result acquisition unit 27 and (ii) the landmark position included in the map data is equal to or greater than the first threshold value. However, it is not necessarily limited to this. For example, when the lateral position can be estimated using the position of the recognized road edge, the detailed position is specified by using the lateral position estimated using the position of the recognized road edge (hereinafter, third embodiment). Hereinafter, an example of a third embodiment will be described with reference to the drawings.

<Schematic Configuration of Vehicular System 1b>

Figure 4:
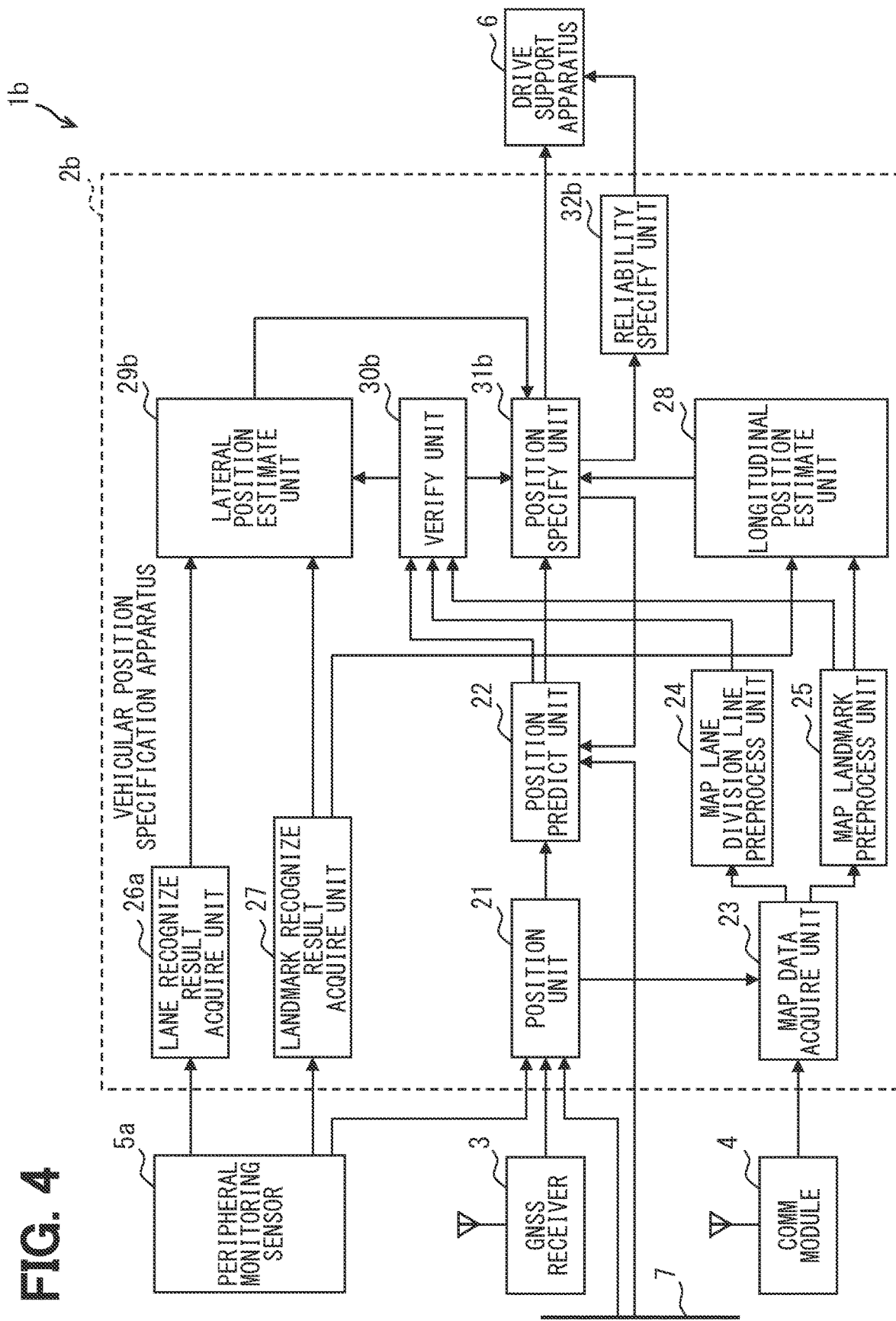
FIG. 4 is a diagram showing an example of a schematic configuration of a vehicular system and a vehicular position specification apparatus.

As shown in FIG. 4, the vehicular system 1b of a third embodiment includes a vehicular position specification apparatus 2b, a GNSS receiver 3, a communication module 4, a peripheral monitoring sensor 5a, and a driving apparatus 6. The vehicular system 1b is the same as the vehicular system 1a of the second embodiment except that the vehicular position specification apparatus 2b is included in place of the vehicular position specification apparatus 2a.

<Schematic Configuration of Vehicular Position Specification Apparatus 2b>

Subsequently, an example of the schematic configuration of the vehicular position specification apparatus 2b will be described with reference to FIG. 4. As shown in FIG. 4, the vehicular position specification apparatus 2b includes a positioning unit 21, a position prediction unit 22, a map data cutting unit 23, a mapped lane division line preprocessing unit 24, a mapped landmark preprocessing unit 25, a lane recognition result acquisition unit 26a, a landmark recognition result acquisition unit 27, a longitudinal position estimation unit 28, a lateral position estimation unit 29b, a verification unit 30b, a position specification unit 31b, and a reliability specification unit 32b, as functional blocks. The vehicular position specification apparatus 2b is the same as the vehicular position specification apparatus 2a of the second embodiment, except that the lateral position estimation unit 29a, the verification unit 30a, the position specification unit 31a, and the reliability specification unit 32 are translated into the lateral position estimation unit 29b, the verification unit 30b, the position specification unit 31b, and the reliability specification unit 32b.

The verification unit 30b does not perform verification to determine whether or not the lateral position having estimated by the lateral position estimation unit 29b is adopted for specifying the detailed position in the position specification unit 31b, but performs verification to determine whether or not the lateral position to be estimated by the lateral position estimation unit 29b is adopted for specifying the detailed position in the position specification unit 31b. The verification unit 30b determines whether or not the lateral deviation between the landmark position indicated by the landmark recognition result acquired by the landmark recognition result acquisition unit 27 and the mapped landmark position is equal to or greater than the above-mentioned first threshold value. It should be noted that the landmark position indicated by the landmark recognition result as used herein need only be in a mode comparable to the position of the mapped landmark.

As an example, assuming the lateral position of the host vehicle on the map as the lateral position indicated by the position of the host vehicle predicted by the position prediction unit 22, the verification unit 30 specifies a translated landmark position that is the position on the map into which the relative position of the landmark with respect to the host vehicle indicated by the landmark recognition result acquired by the landmark recognition result acquisition unit 27 is translated. The verification unit 30b may determine whether or not the lateral deviation between the specified translated landmark position of the landmark and the position of the mapped landmark is equal to or greater than the first threshold value. The position of the host vehicle predicted by the position prediction unit 22 used by the verification unit 30b may be a detailed position of the host vehicle having been specified at the previous time by the position specification unit 31b if such a detailed position of the host vehicle was enabled to be specified at the previous time. On the other hand, when the detailed position of the host vehicle has not yet been specified by the position specification unit 31b, the position of the host vehicle as another reference position may be used. For example, the coordinate information acquired from the GNSS receiver 3 may be used as the reference position of the host vehicle.

Then, suppose a case where (i) the above-mentioned lateral deviation is equal to or greater than the first threshold value, and (ii) the lateral position can be estimated by the lateral position estimation unit 29b using the position of the recognized road edge indicated by the recognition result of the road edge acquired by the lane recognition result acquisition unit 26a. In such a case, the verification unit 30b determines that the lateral position estimated by the lateral position estimation unit 29b using the position of the recognized road edge is adopted for specifying the detailed position in the position specification unit 31b. The case, where the lateral position can be estimated by the lateral position estimation unit 29b using the position of the recognized road edge indicated by the recognition result of the road edge acquired by the lane recognition result acquisition unit 26a, includes a case where the road edge can be recognized and the information on the position of the corresponding mapped road edge exists in the map data.

Further, suppose a case where (i) the above-mentioned lateral deviation is equal to or greater than the first threshold value, and (ii) the lateral position cannot be estimated by the lateral position estimation unit 29b using the position of the recognized road edge indicated by the recognition result of the road edge acquired by the lane recognition result acquisition unit 26a. In such a case, the verification unit 30b may determine that the lateral position estimated by the lateral position estimation unit 29b is not adopted for specifying the detailed position by the position specification unit 31b. Here, the case, where the lateral position cannot be estimated by the lateral position estimation unit 29b using the position of the recognized road edge indicated by the recognition result of the road edge acquired by the lane recognition result acquisition unit 26a, includes a case where the road edge cannot be recognized, and a case where the information on the position of the corresponding mapped road edge does not exist in the map data.

In contrast, suppose a case where (i) the above-mentioned lateral deviation is less than the first threshold value, and (ii) the lateral position can be estimated by the lateral position estimation unit 29b using the position of the recognized lane division line indicated by the recognition result of the lane division line acquired by the lane recognition result acquisition unit 26a. In such a case, the verification unit 30b determines that the lateral position estimated by the lateral position estimation unit 29b using the position of the recognized lane division line is adopted for specifying the detailed position in the position specification unit 31b. The case, where the lateral position can be estimated by the lateral position estimation unit 29b using the position of the recognized lane division line indicated by the recognition result of the lane division line acquired by the lane recognition result acquisition unit 26a, includes a case where (i) the lane division line can be recognized and (ii) the information on the position of the corresponding mapped lane division line exists in the map data.

Further, suppose a case where (i) the above-mentioned lateral deviation is less than the first threshold value, (ii) the lateral position cannot be estimated by the lateral position estimation unit 29b using the position of the recognized lane division line indicated by the recognition result of the lane division line acquired by the lane recognition result acquisition unit 26a, and (iii) the lateral position can be estimated by the lateral position estimation unit 29b using the position of the recognized road edge indicated by the recognition result of the road edge acquired by the lane recognition result acquisition unit 26a. In such a case, the verification unit 30b may determine that the lateral position estimated by the lateral position estimation unit 29b using the position of the recognized lane division line is adopted for specifying the detailed position in the position specification unit 31b.

Further, suppose a case where (i) the above-mentioned lateral deviation is less than the first threshold value, (ii) the lateral position cannot be estimated by the lateral position estimation unit 29b using the position of the recognized lane division line indicated by the recognition result of the lane division line acquired by the lane recognition result acquisition unit 26a and (iii) the lateral position cannot be estimated by the lateral position estimation unit 29b using the position of the recognized road edge indicated by the recognition result of the road edge acquired by the lane recognition result acquisition unit 26a. In such a case, the verification unit 30b may determine that the lateral position estimated by the lateral position estimation unit 29b is not adopted for specifying the detailed position by the position specification unit 31b.

The lateral position estimation unit 29b is different from the lateral position estimation unit 29a of the second embodiment in that the lateral position is estimated according to the result of the determination by the verification unit 30b. Suppose a case where the verification unit 30b determines that the lateral position estimated by the lateral position estimation unit 29b using the position of the recognized lane division line is adopted for specifying the detailed position in the position specification unit 31b. In such a case, the lateral position estimation unit 29b estimates the lateral position of the host vehicle on the map using the position of the recognized lane division line indicated by the recognition result of the lane division line acquired by the lane recognition result acquisition unit 26a.

In contrast, suppose a case where the verification unit 30b determines that the lateral position estimated by the lateral position estimation unit 29b using the position of the recognized road edge is adopted for specifying the detailed position in the position specification unit 31b. In such a case, the lateral position estimation unit 29b estimates the lateral position of the host vehicle on the map using the position of the recognized road edge indicated by the recognition result of the road edge acquired by the lane recognition result acquisition unit 26a. When estimating the lateral position of the host vehicle on the map using the position of the recognized road edge, the lateral position estimation unit 29b collates the position of the recognized road edge with the position of the mapped road edge. Thereby, it may be configured to perform localization for estimating the lateral position of the host vehicle on the map.

In addition, when the verification unit 30b determines that the lateral position estimated by the lateral position estimation unit 29b is not adopted for specifying the detailed position in the position specification unit 31b, the lateral position estimation unit 29b does not estimate the lateral position of the host vehicle on the map.

When the lateral position is estimated by the lateral position estimation unit 29b, the position specification unit 31b uses the estimated lateral position and the longitudinal position estimated by the longitudinal position estimation unit 28 to specify the detailed position of the host vehicle. As an example, in the same manner as the position specification unit 31, the position specification unit 31b may calculate and specify the detailed position and traveling direction of the host vehicle from the position of the host vehicle predicted by the position prediction unit 22 and the estimated longitudinal and lateral positions by the extended Kalman filter. The position specification unit 31b specifies the lateral position estimated by the lateral position estimation unit 29b and the longitudinal position estimated by the longitudinal position estimation unit 28 as the lateral position and the longitudinal position of the host vehicle, respectively. This may be configured to specify the detailed position of the host vehicle.

When the lateral position is not estimated by the lateral position estimation unit 29b, the position specification unit 31b may specify, for example, the position of the host vehicle predicted by the position predicting unit 22 as the detailed position of the host vehicle. As an example, the position specification unit 31b specifies the lateral position of the host vehicle of the position of the host vehicle predicted by the position prediction unit 22, and the longitudinal position estimated by the longitudinal position estimation unit 28 as the lateral position and the longitudinal position of the host vehicle, respectively. This may be configured to specify the detailed position of the host vehicle.

The reliability specification unit 32b of the second embodiment is the same as the reliability specification unit 32 of the second embodiment, except for specifying the reliability of the detailed position of the host vehicle specified by the position specification unit 31b instead of the detailed position of the host vehicle specified by the position specification unit 31.

<Detailed Position Specification Related Process in Vehicular Position Specification Apparatus 2b>

Figure 5:
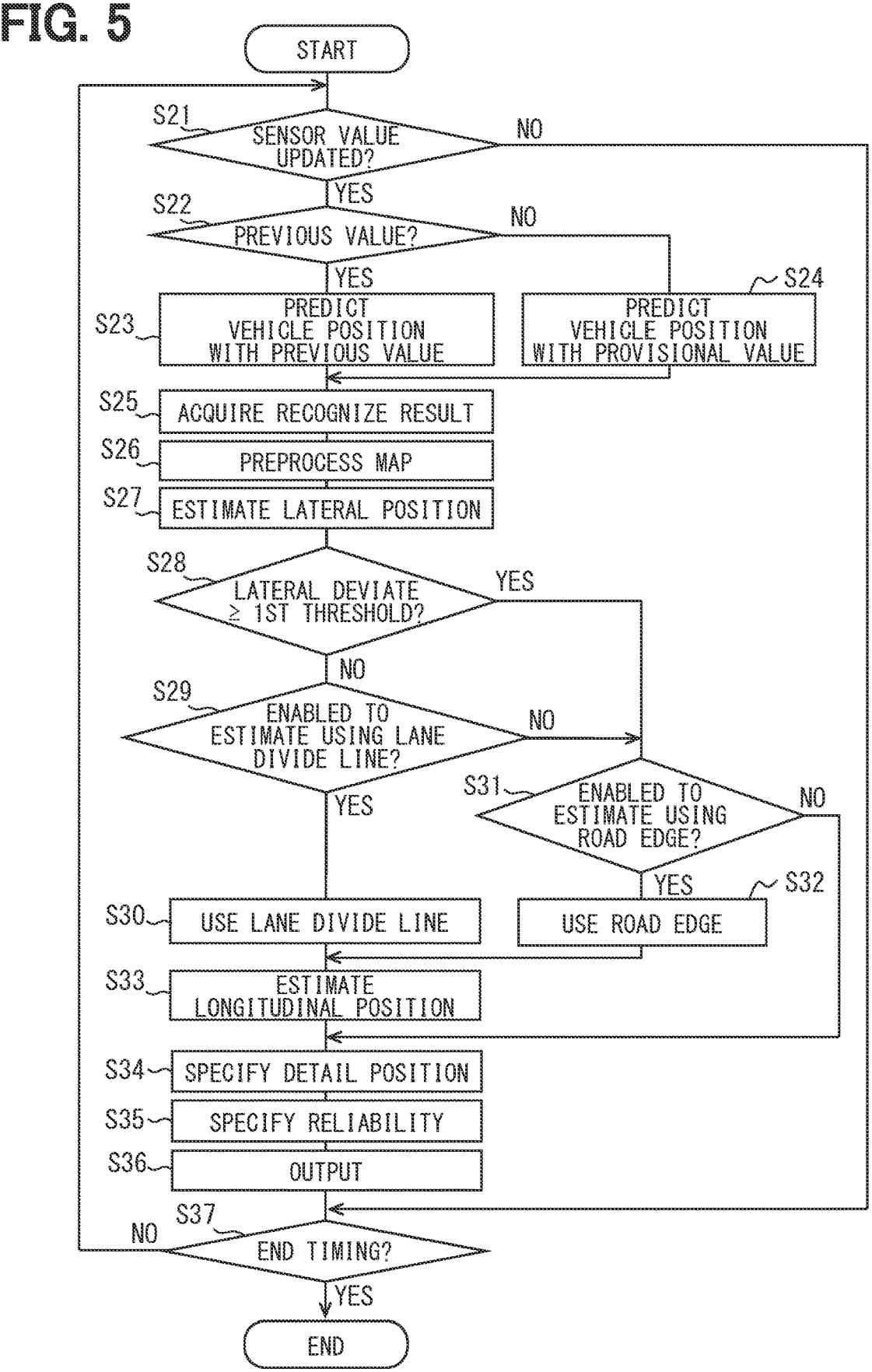
FIG. 5 is a flowchart showing an example of a sequence of a detailed position specification related process in a vehicular position specification apparatus.

Here, an example of the sequence of the detailed position specification related process in the vehicular position specification apparatus 2b will be described with reference to the flowchart of FIG. 5. Execution of the steps included in the detailed position specification related process by the computer corresponds to execution of the vehicular position specification method. The flowchart of FIG. 5 may be configured to be started when, for example, the power switch is turned on.

In step S21, in the same manner as in S1, when the detection result (that is, the sensor value) in the peripheral monitoring sensor 5a is updated (YES in S21), the process proceeds to step S22. On the other hand, when the sensor value is not updated (NO in S21), the process proceeds to step S37.

In step S22, when there is a detailed position (that is, the previous value) of the host vehicle previously specified by the position specification unit 31b (YES in S22), the process proceeds to step S23. On the other hand, when there is no previous value (NO in S22), the process proceeds to step S24. The situation, where the detailed position of the host vehicle has never been specified by the position specification unit 31b since the flowchart of FIG. 5 was started, corresponds to the case where there is no previous value.

In step S23, the position prediction unit 22 provisionally predicts the position of the host vehicle from the previous value and the behavior information of the host vehicle, and the process proceeds to step S25. On the other hand, in step S24, the position prediction unit 22 predicts the position of the host vehicle by using the position of the host vehicle (that is, a provisional value) as another reference instead of using the previous value.

In step S25, the lane recognition result acquisition unit 26a acquires the recognition result of the lane division line and the road edge detected and recognized by the peripheral monitoring sensor 5a. When the lane division line and the road edge cannot be recognized, the lane recognition result acquisition unit 26a may acquire the recognition result indicating that the recognition was not possible. Further, the landmark recognition result acquisition unit 27 acquires the landmark recognition result detected and recognized by the peripheral monitoring sensor 5*a*.

In step S26, the mapped landmark preprocessing unit 25 acquires the map data of the landmark from the map data cut out by the map data cutting unit 23. The processing of S25 and the processing of S26 may be performed in parallel, or the order may be changed.

In step S27, the longitudinal position estimation unit 28 collates the position of the recognized landmark indicated by the recognition result of the landmark acquired in S25 with the position of the mapped landmark included in the map data acquired in S26, to thereby estimate the longitudinal position of the host vehicle.

In step S28, the verification unit 30*b* determines whether or not a lateral deviation between the translated landmark position specified from the position of the recognized landmark indicated by the recognition result of the landmark acquired in S25 and the position of the mapped landmark included in the map data acquired in S26 is equal to or greater than the first threshold value. Then, when the lateral deviation is equal to or greater than the first threshold value (YES in S28), the process proceeds to step S31. On the other hand, when the lateral deviation is less than the first threshold value (NO in S28), the process proceeds to step S29.

In step S29, it is determined whether the lateral position can be estimated by the lateral position estimation unit 29*b* using the position of the recognized lane division line indicated by the recognition result of the lane division line acquired in S25. When the lateral position can be estimated (YES in S29), the process proceeds to step S30. On the other hand, when the lateral position cannot be estimated by the lateral position estimation unit 29*b* using the position of the recognized lane division line indicated by the recognition result of the lane division line acquired in S25 (NO in S29), the process proceeds to step S31.

In step S30, the verification unit 30*b* determines to adopt the lateral position estimated by the lateral position estimation unit 29*b* using the position of the recognized lane division line (that is, using the lane division line) for specifying the detailed position in the position specification unit 31*b*. The process proceeds to step S33.

In step S31, when the lateral position can be estimated by the lateral position estimation unit 29*b* using the position of the recognized road edge indicated by the recognition result of the road edge acquired in S25 (YES in S31), the process proceeds to step S32. On the other hand, when the lateral position cannot be estimated by the lateral position estimation unit 29*b* using the position of the recognized road edge indicated by the recognition result of the road edge acquired in S25 (NO in S31), the process proceeds to step S34.

In step S32, the verification unit 30*b* determines to adopt the lateral position estimated by the lateral position estimation unit 29*b* using the position of the recognized road edge (that is, using the road edge) for specifying the detailed position in the position specification unit 31*b*. Then, the process proceeds to step S33.

In step S33, the lateral position estimation unit 29*b* estimates the lateral position of the host vehicle. In S33, when it is determined in S30 that the lane division line is used, the mapped lane division line preprocessing unit 24 may acquire the map data of the lane division line from the map data cut out by the map data cutting unit 23. Then, the lateral position of the host vehicle may be estimated by collating the position of the recognized lane division line indicated by the recognition result of the lane division line acquired in S25 with the position of the mapped lane division line included in the acquired map data. On the other hand, when it is determined in S32 that the road edge is used, the mapped lane division line preprocessing unit 24 may acquire the map data of the road edge from the map data cut out by the map data cutting unit 23. Then, the lateral position of the host vehicle may be estimated by collating the position of the recognized road edge indicated by the recognition result of the road edge acquired in S25 with the position of the mapped road edge included in the acquired map data.

In step S34, the position specification unit 31*b* specifies the detailed position of the host vehicle. In S34, when the lateral position of the host vehicle is estimated in S33, the detailed position of the host vehicle is specified by using the lateral position estimated in S33 and the longitudinal position estimated in S27. On the other hand, when the lateral position of the host vehicle is not estimated in S33, for example, the detailed position of the host vehicle may be specified by using the lateral position of the host vehicle of the position of the host vehicle predicted in S23 and the longitudinal position estimated in S27. The processing of S27 may be performed at any timing after the processing of S25 and before the processing of S34.

In step S35, the reliability specification unit 32*b* specifies the reliability of the detailed position of the host vehicle specified in S34. In step S36, the position specification unit 31*b* outputs the detailed position of the host vehicle specified in S34 to the driving support apparatus 6. Further, the reliability specification unit 32*b* outputs the reliability of the detailed position specified in S35 to the driving support apparatus 6.

In step S37, when it is the end timing of the detailed position specification related process (YES in S37), the detailed position specification related process is ended. On the other hand, when it is not the end timing of the detailed position specification related process (NO in S37), the process returns to S21 and the processing is repeated. An example of the end timing of the detailed position specification related process is that the power switch is turned off.

Brief of Third Embodiment

Even with the configuration of the third embodiment, it is possible to estimate the lateral position by using the recognition result of the lane division line along the traffic lane. Therefore, when the recognition of the lane division line is correct, it is possible to specify the lateral position of the host vehicle with higher accuracy than to specify the lateral position of the host vehicle by satellite navigation and/or inertial navigation.

Further, according to the configuration of the third embodiment, as described above, when (i) the lateral deviation between the translated landmark position and the mapped landmark position is equal to or greater than the first threshold value, and (ii) the lateral position can be estimated by the lateral position estimation unit 29*b* using the position of the recognized road edge indicated by the recognition result of the road edge, this lateral position estimated using the position of the recognized road edge is used to specify the lateral position of the host vehicle. According to the estimation of the lateral position using the position of the recognized road edge, it is possible to suppress at least the erroneous specification of the lateral position of the host vehicle outside the road. Therefore, it is possible to more accurately specify the lateral position of the host vehicle without using the lateral position which is likely to be erroneously estimated due to the recognition error of the lane division line.

Further, according to the configuration of the third embodiment, the lateral position estimation unit 29b does not estimate the lateral position determined not to be used for specifying the detailed position of the host vehicle, so that unnecessary processing can be reduced.

Further, even in the configuration of the third embodiment, the landmark recognition result used for estimating the longitudinal position is used for verification to determine whether or not the lateral position estimated by the lateral position estimation unit 29b is adopted for specifying the detailed position in the position specification unit 31b. Therefore, it is possible to specify the lateral position of the vehicle more accurately while eliminating the waste of recognizing the landmark only for this verification.

The verification unit 30b may be configured to perform verification to determine whether or not the lateral position estimated by the lateral position estimation unit 29b is adopted for specifying the detailed position by the position specification unit 31b. When adopting this configuration, for example, the following may be performed.

Suppose a case where it is possible to estimate the lateral position using the recognized lane division line and the lateral position using the recognized road edge, and the lateral deviation between the translated landmark position and the mapped landmark position is less than the first threshold value. In such a case, it may be determined that the lateral position estimated by the lateral position estimation unit 29b using the position of the recognized lane division line is adopted for specifying the detailed position in the position specification unit 31b. On the other hand, when this lateral deviation is equal to or greater than the first threshold value, it may be determined that the lateral position estimated by the lateral position estimation unit 29b using the position of the recognition road edge is adopted for specifying the detailed position by the position specification unit 31b.

Suppose a case where the lateral position cannot be estimated using the recognized lane division line, but the lateral position can be estimated using the recognized road edge, and the lateral deviation between the translated landmark position and the mapped landmark position is less than the first threshold value. In such a case, it may be determined that the lateral position estimated by the lateral position estimation unit 29b using the position of the recognized road edge is adopted for specifying the detailed position by the position specification unit 31b. On the other hand, when the lateral deviation is equal to or greater than the first threshold value, it may be determined that the lateral position estimated by the lateral position estimation unit 29b is not adopted for specifying the detailed position by the position specification unit 31b. When neither the lateral position can be estimated using the recognized lane division line nor the lateral position can be estimated using the recognized road edge, it may be determined that the lateral position estimated by the lateral position estimation unit 29b is not adopted for specifying the detailed position by the position specification unit 31b.

Fourth Embodiment

The above-described embodiment has described a configuration which uses the landmark recognition result, which is used for estimating the longitudinal position, so as to perform verification to determine whether or not the lateral position estimated by the lateral position estimation unit 29, 29a, 29b is adopted for specifying the detailed position in the position specification unit 31, 31a, 31b. However, it is not necessarily limited to this. For example, the landmark used to estimate the longitudinal position may be different from the landmark used for verification to determine whether or not the lateral position estimated by the lateral position estimation unit 29, 29a, 29b is adopted for specifying the detailed position in the position specification unit 31, 31a, 31b.

Fifth Embodiment

In the above-described embodiments, the vehicular position specification apparatus 2, 2a, 2b is configured to acquire map data from the outside of the host vehicle via the communication module 4. However, it is not necessarily limited to this. For example, the vehicular position specification apparatus 2, 2a, 2b may be configured to acquire map data from the non-volatile memory mounted on the host vehicle. The non-volatile memory may be configured to be provided outside the vehicular position specification apparatus 2, 2a, 2b, or may be configured to be provided inside the vehicular position specification apparatus 2, 2a, 2b.

Sixth Embodiment

In the above-described embodiments, an example is shown in which the GNSS receiver 3 and the vehicular position specification apparatus 2, 2a, 2b are provided as separate bodies. However, it is not necessarily limited to this. For example, the GNSS receiver 3 and the vehicular position specification apparatus 2, 2a, 2b may be integrated into one body.

Seventh Embodiment

In the above-described embodiments, the vehicular position specification apparatus 2, 2a, 2b is configured to include the reliability specification unit 32. However, it is not necessarily limited to this. For example, the vehicular position specification apparatus 2, 2a, 2b may be configured not to include the reliability specification unit 32, 32b.

Eighth Embodiment

In the above-described embodiments, the vehicular position specification apparatus 2, 2a, 2b is configured to estimate both the longitudinal position and the lateral position of the host vehicle by localization. However, it is not necessarily limited to this. For example, the vehicular position specification apparatus 2, 2a, 2b may be configured to estimate the lateral position of the host vehicle by localization but not the longitudinal position of the host vehicle. In this case, the longitudinal position of the host vehicle may be determined by satellite navigation and/or inertial navigation.

Ninth Embodiment

In the above-described embodiments, an example is given in which the peripheral monitoring sensor 5, 5a for detecting landmarks and the peripheral monitoring sensors 5, 5a for detecting lane division lines and road edges are provided as a common front camera. However, it is not necessarily limited to this. For example, the peripheral monitoring sensor 5, 5a for detecting landmarks and the peripheral monitoring sensor 5, 5a for detecting lane division lines and road edges may be partially or completely different types of sensors. For example, the sensor for detecting landmarks may be a camera and a millimeter-wave radar, while the sensor for detecting a lane division line or a road edge may be a camera. In this case, the sensor fusion technology that uses the detection results of a plurality of types of sensors in combination may be used for the recognition of landmarks.

Note that the present disclosure is not limited to the embodiments described above and can variously be modified within the scope of the disclosure. An embodiment obtained by appropriately combining the technical means disclosed in the different embodiments is also included in the technical scope of the present disclosure.

The vehicular position specification apparatus and methods thereof described in the above embodiments in the present disclosure may be implemented by one or more than one special-purpose computer, which may be created by configuring (a) at least one memory and at least one processor programmed to execute one or more particular functions embodied in computer programs. Alternatively, the vehicular position specification apparatus and methods thereof described in the above embodiments in the present disclosure may be implemented by one or more than one special purpose computer, which may be created by configuring (b) at least one processor provided by one or more special purpose hardware logic circuits. Yet alternatively, the vehicular position specification apparatus and methods thereof described in the above embodiments in the present disclosure may be implemented by one or more than one special purpose computer, which may be created by configuring a combination of (a) at least one memory and at least one processor programmed to execute one or more particular functions embodied in computer programs and (b) at least one processor provided by one or more special purpose hardware logic circuits.

The computer program may also be stored in a computer-readable non-transitory tangible storage medium as instructions to be executed by a computer.

For reference to further explain features of the present disclosure, the description is added as follows.

It is required to specify a vehicular position with higher accuracy for traveling control such as automatic driving of a vehicle such as automobile. Technologies for specifying a vehicular position with high accuracy includes a technology for specifying the vehicular position by collating (that is, matching) the map data with the recognition result of the driving environment using the sensing result of the peripheral monitoring sensor, which is an autonomous sensor that monitors the surroundings of the vehicle.

For example, there is disclosed a technology which estimates the lateral position of the vehicle based on (i) the left and right lane division lines of the traveling lane recognized using the image captured by the camera and (ii) the left and right lane division lines of the traveling lane included in the map information.

The above technology does not assume a case where the recognition of the lane division line is incorrect. Therefore, when the lane division line is erroneously recognized, the lateral position of the vehicle may be erroneously specified. Even if the reliability of the recognition of the lane division line is calculated, it may not be verified whether the calculation result of the reliability is correct or not. In such a case, the problem of erroneously specifying the lateral position of the vehicle remains.

It is thus desired for the present disclosure to provide a vehicular position specification apparatus and a vehicular position specification method capable of more accurately specifying the lateral position of a vehicle.

Aspects of the present disclosure described herein are set forth in the following clauses.

In order to achieve the above object, according to an aspect of the present disclosure, a vehicular position specification apparatus is provided to include the following units as follows. A lane recognition result acquisition unit is configured to acquire a recognition result of a boundary line, the boundary line being (i) a lane division line along a traffic lane or (ii) the lane division line and a road edge that is a boundary between a road and an outside of the road, the recognition result of each of the lane division line and road edge being recognized from a detection result by a peripheral monitoring sensor that monitors a periphery of the vehicle. A landmark recognition result acquisition unit is configured to acquire a recognition result of a landmark that is different from the boundary line, the recognition result being recognized from the detection result by the peripheral monitoring sensor. A map data acquisition unit is configured to acquire a map data of a map including a position of the boundary line and a position of the landmark. A lateral position estimation unit is configured to estimate, one the map, a lateral position of the vehicle on a traveling road by collating a relative position of the boundary line with respect to the vehicle indicated by the recognition result of the boundary line acquired by the lane recognition result acquisition unit with the position of the boundary line included in the map data. A position specification unit is configured not to specify the lateral position of the vehicle using the lateral position estimated by the lateral position estimation unit using the lane division line of the boundary line in response to a lateral deviation between (i) the position of the landmark indicated by the recognition result of the landmark acquired by the landmark recognition result acquisition unit and (ii) the position of the landmark included in the map data being equal to or greater than a first threshold value, and to specify the lateral position of the vehicle using the lateral position estimated by the lateral position estimation unit using the lane division line of the boundary line in response to the lateral deviation being less than the first threshold value.

In order to achieve the above object, according to another aspect of the present disclosure, a vehicular position specification method is provided to be implemented by a computer. The method is used in a vehicle. The method includes the steps as follows. A lane recognition result acquiring step is to acquire is to recognition result of a boundary line, the boundary line being (i) a lane division line along a traffic lane or (ii) the lane division line and a road edge that is a boundary between a road and an outside of the road, the lane division line and the road edge being recognized from a detection result by a peripheral monitoring sensor that monitors a periphery of the vehicle. A landmark recognition result acquiring step is to acquire a recognition result of a landmark that is different from the boundary line, the recognition result being recognized from the detection result by the peripheral monitoring sensor. A map data acquiring step is to acquire a map data of a map including a position of the boundary line and a position of the landmark. A lateral position estimating step is to estimate a lateral position of the vehicle on a traveling road on the map by collating a relative position of the boundary line with respect to the vehicle indicated by the recognition result of the boundary line acquired with the position of the boundary line included in the map data. A position specifying step is not to specify the lateral position of the vehicle using the lateral position estimated using the lane division line of the boundary line in response to a lateral deviation between (i) a relative position of the landmark with respect to the vehicle indicated by the recognition result of the landmark acquired and (ii) the position of the landmark included in the map data being equal to or greater than a first threshold value, and to specify the lateral position of the vehicle using the lateral position estimated using the lane division line of the boundary line in response to the lateral deviation being less than the first threshold value.

According to the above configuration, a recognition result of a boundary line is acquired which is recognized from a detection result by a peripheral monitoring sensor. The boundary line is (i) a lane division line along a traffic lane or (ii) the lane division line and a road edge that is a boundary between a road and an outside of the road. A relative position of a lane division line with respect to the vehicle is specified from the recognition result of the boundary line. The relative position of the lane division line is collated with the position of the lane division line included in the map data. This makes it possible to estimate the lateral position, which is the position of the vehicle in the lateral direction on the traveling road on the map. Therefore, it is possible to specify the position of the vehicle with higher accuracy when the recognition of the lane division line is correct.

Further, according to the above configuration, when the lateral deviation between the landmark position indicated by the acquired landmark recognition result and the landmark position included in the map data is equal to or greater than the first threshold value, the lateral position of the vehicle is not specified by using the lateral position estimated by using the position of the lane division line in the boundary line. When the recognition of the lane division line is incorrect, the lateral deviation between the landmark position indicated by the recognition result of the acquired landmark and the position of the landmark included in the map data becomes large. When the lateral deviation between the landmark position indicated by the acquired landmark recognition result and the landmark position included in the map data is equal to or greater than the first threshold value, the lateral position of the vehicle is not specified by using the lateral position estimated using the position of the lane division line in the boundary line. As a result, it is not necessary to specify the lateral position of the vehicle by using the lateral position which is likely to be erroneously estimated due to the recognition error of the lane division line. On the other hand, based on the fact that the lateral deviation between the landmark position indicated by the acquired landmark recognition result and the landmark position included in the map data is less than the first threshold value, the lateral position of the vehicle is specified by using the lateral position estimated using the position of the lane division line in the boundary line. Therefore, the possibility of erroneous recognition of the lane division line is low and it is possible to specify the lateral position of the vehicle by using the lateral position where the possibility of erroneous estimation is low. Therefore, it is possible to specify the lateral position of the vehicle more accurately because it is not necessary to specify the lateral position of the vehicle by using the lateral position that is likely to be erroneously estimated.

What is claimed is:

1. A vehicular position specification apparatus used in a vehicle, comprising:
a lane recognition result acquisition unit configured to acquire a recognition result of a boundary line, the boundary line being (i) a lane division line along a traffic lane or (ii) the lane division line and a road edge that is a boundary between a road and an outside of the road, the recognition result of each of the lane division line and road edge being recognized from a detection result by a peripheral monitoring sensor that monitors a periphery of the vehicle;
a landmark recognition result acquisition unit configured to acquire a recognition result of a landmark that is different from the boundary line, the recognition result being recognized from the detection result by the peripheral monitoring sensor;
a map data acquisition unit configured to acquire a map data of a map including a position of the boundary line and a position of the landmark;
a lateral position estimation unit configured to estimate, on the map, a lateral position of the vehicle on a traveling road by collating a relative position of the boundary line with respect to the vehicle indicated by the recognition result of the boundary line acquired by the lane recognition result acquisition unit with the position of the boundary line included in the map data; and
a position specification unit configured to specify a detailed position of the vehicle by
not adopting the lateral position of the vehicle using the lateral position estimated by the lateral position estimation unit using the lane division line of the boundary line in response to a lateral deviation between (i) the position of the landmark indicated by the recognition result of the landmark acquired by the landmark recognition result acquisition unit and (ii) the position of the landmark included in the map data being equal to or greater than a first threshold value, and
adopting the lateral position of the vehicle using the lateral position estimated by the lateral position estimation unit using the lane division line of the boundary line in response to the lateral deviation being less than the first threshold value,
wherein
the position specification unit outputs the detailed position of the vehicle to a driving support apparatus, and
the driving support apparatus executes a driving support function by using the detailed position of the vehicle.

2. The vehicular position specification apparatus according to claim 1, wherein:
the lane recognition result acquisition unit is further configured to acquire the recognition result of the lane division line of the boundary line, which is recognized from the detection result of the peripheral monitoring sensor that monitors the periphery of the vehicle;
the lateral position estimation unit is further configured to estimate, on the map, the lateral position of the vehicle on the traveling road by collating a relative position of the lane division line with respect to the vehicle indicated by the recognition result of the lane division line acquired by the lane recognition result acquisition unit with the position of the lane division line included in the map data; and
the position specification unit is further configured
not to adopt the lateral position of the vehicle using the lateral position estimated by the lateral position estimation unit, in response to the lateral deviation between (i) the position of the landmark indicated by the recognition result of the landmark acquired by the landmark recognition result acquisition unit and (ii) the position of the landmark included in the map data being equal to or greater than the first threshold value, and to adopt the lateral position of the vehicle using the lateral position estimated by the lateral position estimation unit in response to the lateral deviation being less than the first threshold value.

3. The vehicular position specification apparatus according to claim 1, wherein:
the position of the landmark indicated by the recognition result of the landmark acquired by the landmark recognition result acquisition unit is a translated landmark position that is a position on the map into which a relative position of the landmark with respect to the vehicle indicated by the landmark recognition result acquired by the landmark recognition result acquisition unit is translated assuming the lateral position of the vehicle on the map as the lateral position estimated by the lateral position estimation unit.

4. The vehicular position specification apparatus according to claim 1, further comprising:
a position prediction unit configured to predict the lateral position of the vehicle using vehicle behavior information,
wherein:
the position specification unit is further configured to adopt the lateral position of the vehicle using the lateral position predicted by the position prediction unit, in response to not adopting the lateral position of the vehicle according to the lateral deviation between (i) the position of the landmark indicated by the recognition result of the landmark acquired by the landmark recognition result acquisition unit and (ii) the position of the landmark included in the map data being equal to or greater than the first threshold value.

5. The vehicular position specification apparatus according to claim 4, wherein:
the position prediction unit is further configured to predict the lateral position of the vehicle from the lateral position of the vehicle previously adopted by the position specification unit and the behavior information of the vehicle.

6. The vehicular position specification apparatus according to claim 4, wherein:
(a) in cases of the lateral deviation between (i) the lateral position of the vehicle predicted by the position prediction unit and (ii) the lateral position estimated by the lateral position estimation unit being less than a second threshold value,
the position specification unit is further configured to adopt the lateral position of the vehicle using the lateral position estimated by the lateral position estimation unit without determining whether the lateral deviation between (i) the position of the landmark indicated by the recognition result of the landmark acquired by the landmark recognition result acquisition unit and (ii) the position of the landmark included in the map data is equal to or greater than the first threshold value;
(b) in cases of the lateral deviation between the lateral position of the vehicle predicted by the position prediction unit and the lateral position estimated by the lateral position estimation unit being equal to or greater than the second threshold value,
the position specification unit is further configured
to determine whether the lateral deviation between (i) the position of the landmark indicated by the recognition result of the landmark acquired by the landmark recognition result acquisition unit and (ii) the position of the landmark included in the map data is equal to or greater than the first threshold value,
not to adopt the lateral position of the vehicle using the lateral position estimated by the lateral position estimation unit in response to determining that the lateral deviation is equal to or greater than the first threshold value, and
to adopt the lateral position of the vehicle using the lateral position estimated by the lateral position estimation unit in response to determining that the lateral deviation is less than the first threshold value.

7. The vehicular position specification apparatus according to claim 1, wherein:
the lane recognition result acquisition unit is further configured to acquire the recognition result of each of the lane division line and the road edge of the boundary line, the recognition result of each of the lane division line and the road edge being recognized from the detection result of the peripheral monitoring sensor that monitors the periphery of the vehicle;
in response to
(a) the lateral deviation between (i) the position of the landmark indicated by the recognition result of the landmark acquired by the landmark recognition result acquisition unit and (ii) the position of the landmark included in the map data being equal to or greater than the first threshold value, and
(b) the lateral position being enabled to be estimated by the lateral position estimation unit using the position of the road edge indicated by the recognition result of the road edge acquired by the lane recognition result acquisition unit,
the position specification unit is further configured to adopt the lateral position of the vehicle by using the lateral position estimated by the lateral position estimation unit using the position of the road edge; and
in response to
(a) the lateral deviation between (i) the position of the landmark indicated by the recognition result of the landmark acquired by the landmark recognition result acquisition unit and (ii) the position of the landmark included in the map data being equal to or greater than the first threshold value, and
(b) the lateral position being not enabled to be estimated by the lateral position estimation unit using the position of the road edge indicated by the recognition result of the road edge acquired by the lane recognition result acquisition unit,
the position specification unit is further configured not to adopt the lateral position of the vehicle by using the lateral position estimated by the lateral position estimation unit.

8. The vehicular position specification apparatus according to claim 7, further comprising:
a position prediction unit configured to predict the lateral position of the vehicle using vehicle behavior information,
wherein:
the position of the landmark indicated by the recognition result of the landmark acquired by the landmark recognition result acquisition unit is a position on the map into which a relative position of the landmark with respect to the vehicle indicated by the recognition result of the landmark acquired by the landmark recognition result acquisition unit is translated, assuming the lateral position of the vehicle on the map as the lateral position of the vehicle predicted by the position prediction unit based on the lateral position of the vehicle previously adopted by the position specification unit.

9. The vehicular position specification apparatus according to claim 1, wherein:
  a first accuracy is lower than a second accuracy,
    the second accuracy being of estimating the lateral position of the vehicle on the map by collating a relative position of the lane division line with respect to the vehicle indicated by the recognition result of the lane division line acquired by the lane recognition result acquisition unit with the position of the lane division line included in the map data,
    the first accuracy being of estimating the lateral position of the vehicle on the map by collating a relative position of the landmark with respect to the vehicle indicated by the recognition result of the landmark acquired by the landmark recognition result acquisition unit with the position of the landmark included in the map data.

10. The vehicular position specification apparatus according to claim 6, wherein:
  a first accuracy is lower than a second accuracy,
    the second accuracy being of estimating the lateral position of the vehicle on the map by collating a relative position of the lane division line with respect to the vehicle indicated by the recognition result of the lane division line acquired by the lane recognition result acquisition unit with the position of the lane division line included in the map data,
    the first accuracy being of estimating the lateral position of the vehicle on the map by collating the relative position of the landmark with respect to the vehicle indicated by the recognition result of the landmark acquired by the landmark recognition result acquisition unit with the position of the landmark included in the map data;
  the first threshold value is larger than the second threshold value,
    the first threshold value being a value according to the first accuracy of estimating the lateral position of the vehicle on the map by collating a relative position of the landmark with respect to the vehicle indicated by the recognition result of the landmark acquired by the landmark recognition result acquisition unit with the position of the landmark included in the map data,
    the second threshold value being a value according to the second accuracy of estimating the lateral position of the vehicle on the map by collating a relative position of the lane division line with respect to the vehicle indicated by the recognition result of the lane division line acquired by the lane recognition result acquisition unit with the position of the lane division line included in the map data.

11. The vehicular position specification apparatus according to claim 1, further comprising:
  a longitudinal position estimation unit configured to estimate, on the map, a longitudinal position of the vehicle on the traveling road by collating (i) a relative position of the landmark with respect to the vehicle indicated by the recognition result of the landmark acquired by the landmark recognition result acquisition unit and (ii) the position of the landmark included in the map data,
  wherein:
  the position specification unit is further configured to adopt the longitudinal position of the vehicle by using the longitudinal position estimated by the longitudinal position estimation unit.

12. A computer-implemented vehicular position specification method performed by at least one processor, comprising:
  acquiring a recognition result of a boundary line, the boundary line being (i) a lane division line along a traffic lane or (ii) the lane division line and a road edge that is a boundary between a road and an outside of the road, the lane division line and the road edge being recognized from a detection result by a peripheral monitoring sensor that monitors a periphery of a vehicle;
  acquiring a recognition result of a landmark that is different from the boundary line, the recognition result being recognized from the detection result by the peripheral monitoring sensor;
  acquiring a map data of a map including a position of the boundary line and a position of the landmark;
  estimating a lateral position of the vehicle on a traveling road on the map by collating a relative position of the boundary line with respect to the vehicle indicated by the recognition result of the boundary line acquired with the position of the boundary line included in the map data; and
  specifying a detailed position of the vehicle by
    not adopting the lateral position of the vehicle using the lateral position estimated using the lane division line of the boundary line in response to a lateral deviation between (i) a relative position of the landmark with respect to the vehicle indicated by the acquired recognition result of the landmark and (ii) the position of the landmark included in the map data being equal to or greater than a first threshold value, and
    adopting the lateral position of the vehicle using the lateral position estimated using the lane division line of the boundary line in response to the lateral deviation being less than the first threshold value,
  wherein
  the detailed position of the vehicle is output to a driving support apparatus, and
  the driving support apparatus executes a driving support function by using the detailed position of the vehicle.

13. A vehicular position specification apparatus used in a vehicle, comprising:
  at least one memory; and
  at least one processor communicably coupled with the at least one memory,
  wherein the at least one processor is configured to:
  acquire a recognition result of a boundary line, the boundary line being (i) a lane division line along a traffic lane or (ii) the lane division line and a road edge that is a boundary between a road and an outside of the road, the recognition result of each of the lane division line and road edge being recognized from a detection result by a peripheral monitoring sensor that monitors a periphery of the vehicle;
  acquire a recognition result of a landmark that is different from the boundary line, the recognition result being recognized from the detection result by the peripheral monitoring sensor;
  acquire a map data of a map including a position of the boundary line and a position of the landmark;
  estimate, on the map, a lateral position of the vehicle on a traveling road by collating a relative position of the boundary line with respect to the vehicle indicated by the recognition result of the boundary line with the position of the boundary line included in the map data;
  specify a detailed position of the vehicle by not adopting the lateral position of the vehicle using the lateral position estimated using the lane division line of the boundary line in response to a lateral deviation between (i) the position of the landmark indicated by the recognition result of the landmark and (ii) the position of the landmark included in the map data being equal to or greater than a first threshold value, and adopting the lateral position of the vehicle using the lateral position estimated using the lane division line of the boundary line in response to the lateral deviation being less than the first threshold value, wherein the detailed position of the vehicle is output to a driving support apparatus, and the driving support apparatus executes a driving support function by using the detailed position of the vehicle.

* * * * *